(12) United States Patent
Kim et al.

(10) Patent No.: US 11,792,058 B1
(45) Date of Patent: Oct. 17, 2023

(54) SECURE RANGING AND INTERFERENCE MITIGATION FOR UWB

(71) Applicant: QUALCOMM Incorporated, San Diego, CA (US)

(72) Inventors: Dongsik Kim, San Diego, CA (US); Koorosh Akhavan, San Diego, CA (US); Le Nguyen Luong, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/934,066

(22) Filed: Sep. 21, 2022

(51) Int. Cl.
  *H04L 27/26* (2006.01)
  *H04W 52/18* (2009.01)
  *H04L 5/00* (2006.01)

(52) U.S. Cl.
  CPC ...... *H04L 27/26025* (2021.01); *H04L 5/0048* (2013.01); *H04L 27/26035* (2021.01); *H04W 52/18* (2013.01)

(58) Field of Classification Search
  CPC ......... H04L 27/26025; H04L 27/26035; H04L 5/0048; H04W 52/18
  See application file for complete search history.

(56) References Cited

U.S. PATENT DOCUMENTS

| | | | |
|---|---|---|---|
| 7,280,607 B2 | 10/2007 | McCorkle et al. | |
| 8,379,752 B2 | 2/2013 | Kleider et al. | |
| 10,823,829 B2* | 11/2020 | Kneckt | G01S 13/765 |
| 10,972,141 B2 | 4/2021 | Feng et al. | |
| 11,411,602 B2* | 8/2022 | Yoon | G01S 13/0209 |
| 2003/0198253 A1* | 10/2003 | Ahmed | H04L 27/22 370/335 |
| 2008/0259896 A1* | 10/2008 | Sahinoglu | G06K 7/10306 370/345 |
| 2019/0273636 A1* | 9/2019 | Batra | H04L 25/0226 |
| 2019/0373499 A1 | 12/2019 | Jiang et al. | |
| 2021/0068070 A1* | 3/2021 | Segev | H04W 72/044 |
| 2021/0266055 A1* | 8/2021 | Li | H04B 7/0682 |
| 2022/0001836 A1 | 1/2022 | Baek et al. | |
| 2022/0066010 A1* | 3/2022 | Henry | H04W 76/11 |
| 2022/0116169 A1* | 4/2022 | Stare | H04L 5/0048 |
| 2023/0171729 A1* | 6/2023 | Oh | H04W 64/003 455/456.1 |

* cited by examiner

*Primary Examiner* — Khanh C Tran
(74) *Attorney, Agent, or Firm* — Weaver Austin Villeneuve & Sampson LLP

(57) ABSTRACT

In some implementations, an ultra-wideband (UWB) transmitter may generate a data packet for performing the UWB ranging, wherein: the data packet comprises a plurality of symbols, and the data packet further includes one or more zero-power symbols at one or more respective pseudo-random locations in the plurality of symbols. The UWB transmitter may transmit the data packet via UWB radio frequency (RF) signals during a UWB ranging session between the UWB transmitter and a UWB receiver.

50 Claims, 11 Drawing Sheets

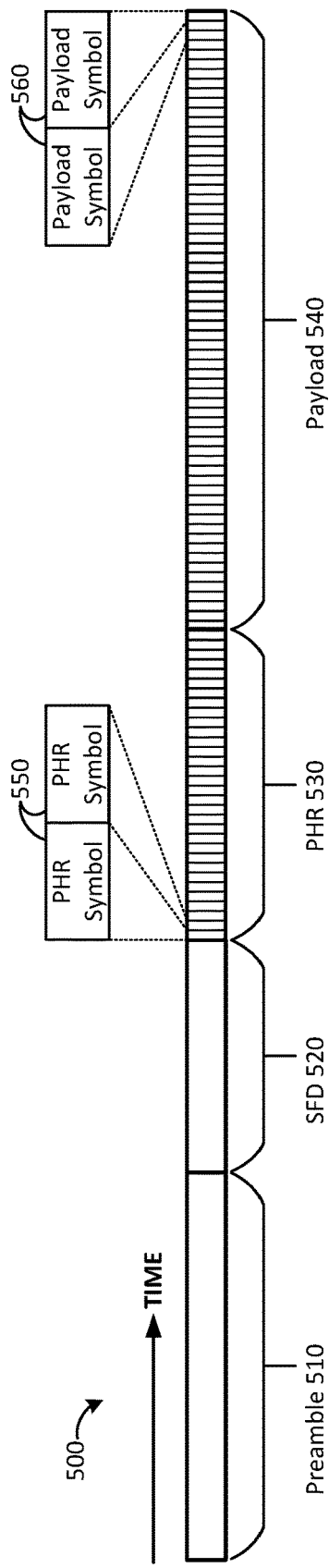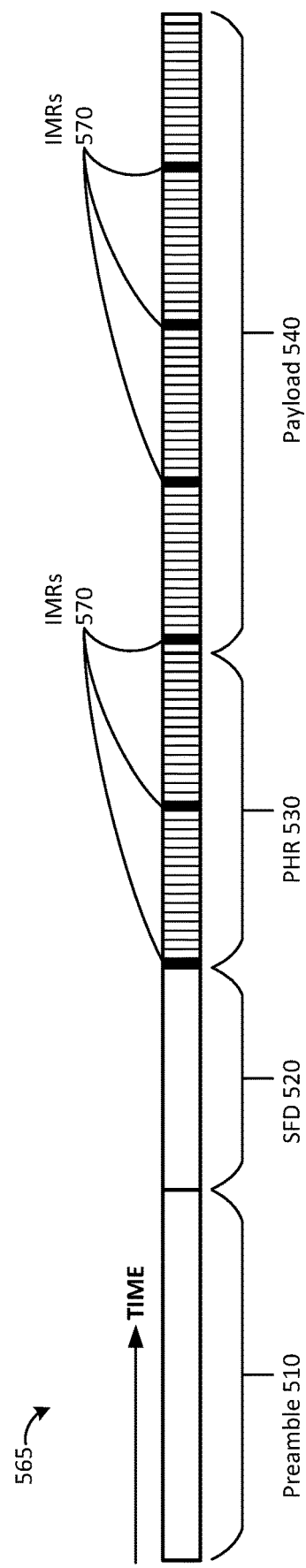

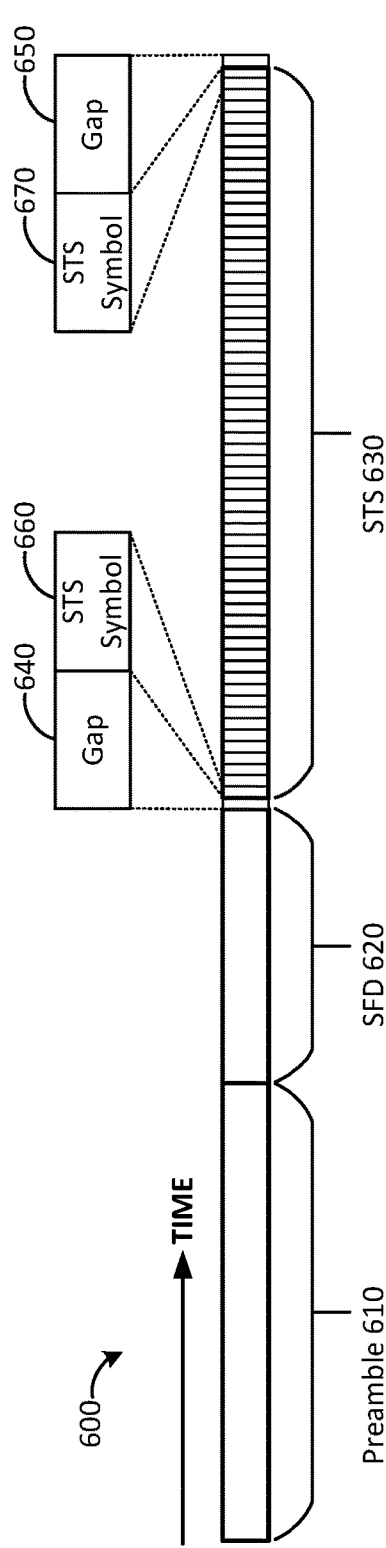
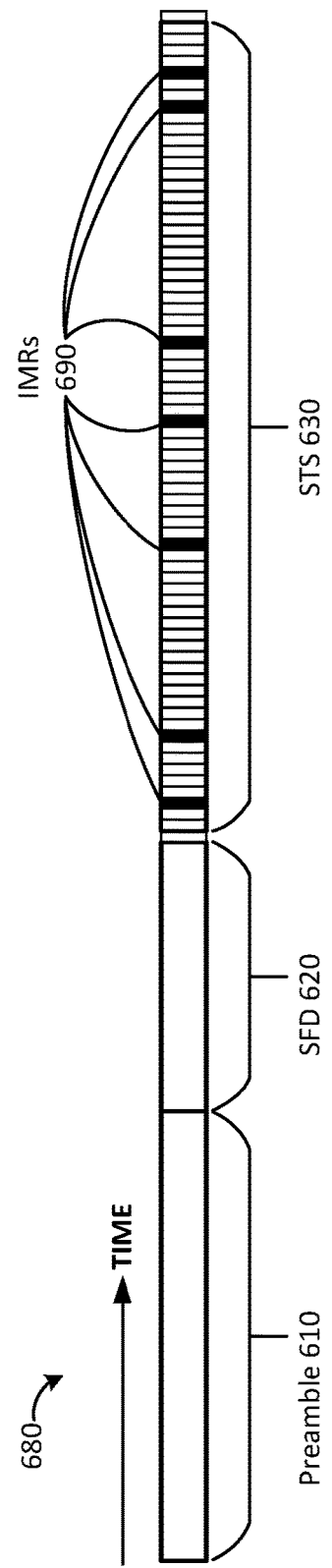

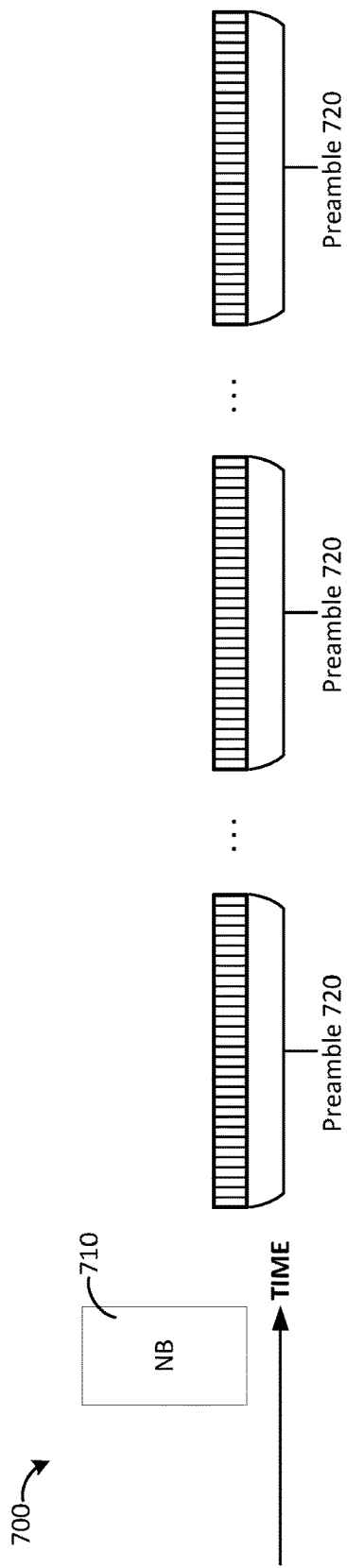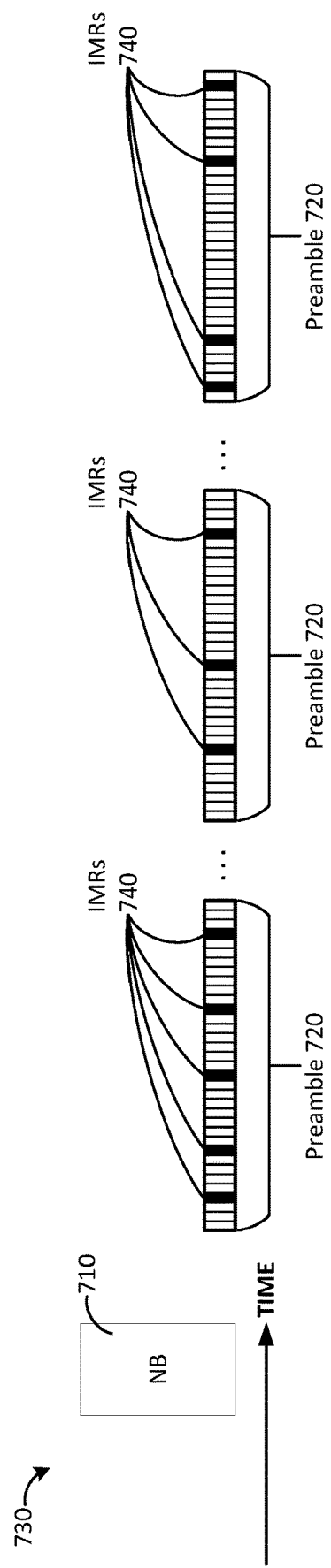
FIG. 7A
FIG. 7B

SECURE RANGING AND INTERFERENCE MITIGATION FOR UWB

BACKGROUND

1. Field of Disclosure

The present disclosure relates generally to the field of radio frequency (RF)-based position determination (or positioning) of an electronic wireless device. More specifically, the present disclosure relates to ultra-wideband (UWB)-based positioning.

2. Description of Related Art

The positioning of devices can have a wide range of consumer, industrial, commercial, military, and other applications. UWB-based positioning (e.g., as defined in IEEE 802.15.4ab and/or other wireless specifications) offers a highly-accurate, low-power positioning solution relative to other RF-based positioning techniques for wireless electronic devices. Such UWB-based positioning may implement some features to help mitigate issues arising from interference or an attack. But UWB-based positioning may still be vulnerable to such attacks and/or interference in some aspects.

BRIEF SUMMARY

An example method of enabling secure ultra-wideband (UWB) ranging, according to this disclosure, may comprise generating, at a UWB transmitter, a data packet for performing the UWB ranging, wherein the data packet comprises a plurality of symbols, and the data packet further includes one or more zero-power symbols at one or more respective pseudo-random locations in the plurality of symbols. The method also may comprise transmitting the data packet by the UWB transmitter via UWB radio frequency (RF) signals during a UWB ranging session between the UWB transmitter and a UWB receiver.

An example method of enabling secure ultra-wideband (UWB) ranging, according to this disclosure, may comprise receiving a data packet at a UWB receiver via UWB radio frequency (RF) signals from a UWB transmitter, wherein the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols. The method also may comprise determining a level of RF interference based on one or more RF signal measurements performed at the UWB receiver during the one or more zero-power symbols. The method also may comprise providing an output at the UWB receiver, the output indicative of the level of RF interference.

An example ultra-wideband (UWB) transmitter for enabling secure UWB ranging, according to this disclosure, may comprise a transceiver, a memory, one or more processors communicatively coupled with the transceiver and the memory, wherein the one or more processors are configured to generate a data packet for performing the UWB ranging, wherein: the data packet comprises a plurality of symbols, and the data packet further includes one or more zero-power symbols at one or more respective pseudo-random locations in the plurality of symbols. The one or more processors further may be configured to transmit the data packet with the transceiver via UWB radio frequency (RF) signals during a UWB ranging session between the UWB transmitter and a UWB receiver.

An example ultra-wideband (UWB) receiver for enabling secure UWB ranging, according to this disclosure, may comprise a transceiver, a memory, one or more processors communicatively coupled with the transceiver and the memory, wherein the one or more processors are configured to receive a data packet with the transceiver via UWB radio frequency (RF) signals from a UWB transmitter, wherein: the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols. The one or more processors further may be configured to determine a level of RF interference based on one or more RF signal measurements performed at the UWB receiver during the one or more zero-power symbols. The one or more processors further may be configured to provide an output indicative of the level of RF interference.

An example apparatus for enabling secure ultra-wideband (UWB) ranging, according to this disclosure, may comprise means for generating, at a UWB transmitter, a data packet for performing the UWB ranging, wherein: the data packet comprises a plurality of symbols, and the data packet further includes one or more zero-power symbols at one or more respective pseudo-random locations in the plurality of symbols. The apparatus further may comprise means for transmitting the data packet via UWB radio frequency (RF) signals during a UWB ranging session between the UWB transmitter and a UWB receiver.

An example apparatus for enabling secure ultra-wideband (UWB) ranging, according to this disclosure, may comprise means for receiving a data packet at a UWB receiver via UWB radio frequency (RF) signals from a UWB transmitter, wherein: the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols. The apparatus further may comprise means for determining a level of RF interference based on one or more RF signal measurements performed at the UWB receiver during the one or more zero-power symbols. The apparatus further may comprise means for providing an output at the UWB receiver, the output indicative of the level of RF interference.

According to this disclosure, an example non-transitory computer-readable medium stores instructions for enabling secure ultra-wideband (UWB) ranging, the instructions comprising code for generating, at a UWB transmitter, a data packet for performing the UWB ranging, wherein the data packet comprises a plurality of symbols, and the data packet further includes one or more zero-power symbols at one or more respective pseudo-random locations in the plurality of symbols. The instructions further may comprise code for transmitting the data packet by the UWB transmitter via UWB radio frequency (RF) signals during a UWB ranging session between the UWB transmitter and a UWB receiver.

According to this disclosure, an example non-transitory computer-readable medium stores instructions for enabling secure ultra-wideband (UWB) ranging, the instructions comprising code for receiving a data packet at a UWB receiver via UWB radio frequency (RF) signals from a UWB transmitter, wherein the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols. The instructions further may comprise code for determining a level of RF interference based on one or more RF signal measurements performed at the UWB receiver during the one or more zero-power symbols. The instructions further may comprise code for providing an output at the UWB receiver, the output indicative of the level of RF interference.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 5A and 5B are timing diagrams showing an example of how zero-power symbols, or interference measurement resources (IMRs), may be used in STS packet configuration 0, according to some embodiments.

FIGS. 6A and 6B are timing diagrams illustrated to show an example of how zero-power symbols, or IMRs, may be used in STS packet configuration 3, according to some embodiments.

FIG. 7A is a timing diagram showing a possible series of narrow band (NB)-assisted UWB communications.

FIG. 7B is a timing diagram showing how the series of NB-assisted UWB communications in FIG. 7A may be modified, according to some embodiments, to include zero-power symbols/IMRs.

Figure 1A:
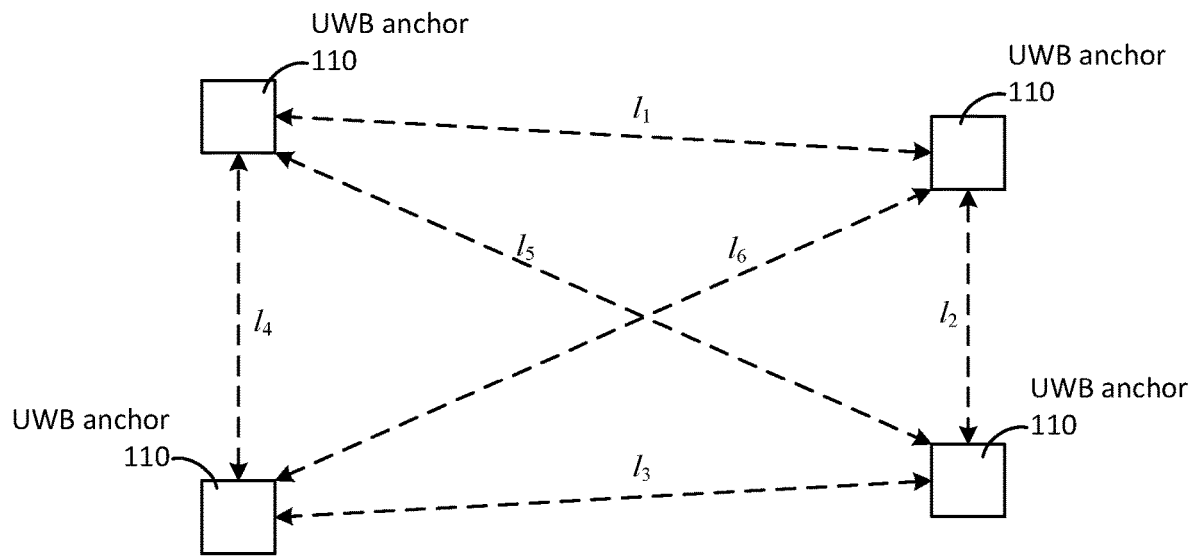
FIGS. 1A and 1B are simplified diagrams illustrating examples of how ultra-wideband (UWB) positioning/ranging may be performed in a network of UWB devices.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave (or waves) that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths, e.g., when a transmitted RF signal reaches a receiver via two or more different spatial paths, e.g., due to reflections.

As previously noted, UWB-based positioning offers a highly-accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system or a wireless network having positioning capabilities (e.g., a cellular network).

Unless otherwise specified, the term "positioning" as used herein (including, for example, UWB-based positioning, cellular-based positioning, satellite-based positioning, and hybrid cellular/UWB positioning) may include absolute location determination, relative location determination, ranging, or a combination thereof. Such positioning may include and/or be based on timing, angular, phase, or power measurements, or a combination thereof (which may include RF sensing measurements) for the purpose of location or sensing services.

The UWB-based positioning of UWB devices such as IOT devices, mobile phones, etc., may be an important feature for the functionality of the device. Knowledge of a precise position of an IOT device on a factory floor, for example, may be key to ensuring the IOT device operates properly. Positioning for devices such as shipping tags or location tags for items or people (e.g., patients in a hospital) also may be key to the functionality of such devices. Other devices, such as cell phones, may also use UWB-positioning to perform a variety of functions. As such, the security and stability of such positioning can be important to the overall functionality of these devices. Embodiments herein are directed toward securing and mitigating interference in UWB-based positioning. Details follow hereafter, after a review of relevant UWB-based positioning technology.

Figure 1B:
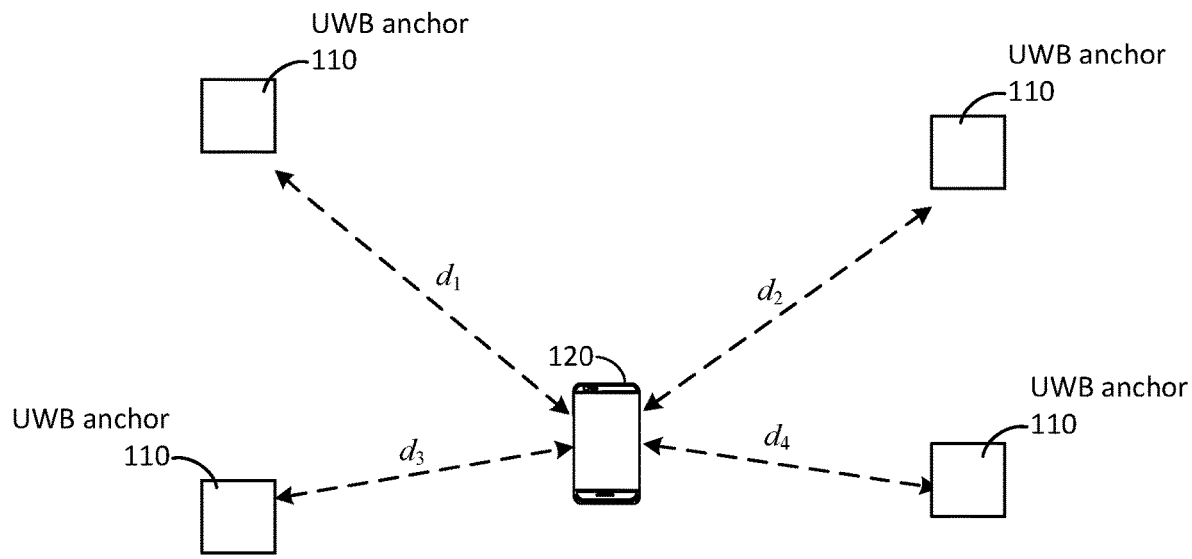

FIGS. 1A and 1B are simplified diagrams illustrating how UWB positioning may be performed in a network (e.g., ad-hoc network) of UWB anchors 110. As referred to herein, "UWB anchors" (or simply "anchors") may comprise UWB devices with known locations that can be used to determine the position of a target 120, or "tag," using UWB RF signals. UWB positioning may be performed utilizing relevant standards (e.g., IEEE 802.15.4ab), which enable high-accuracy, low power positioning.

If the position of one or more UWB anchors 110 is not yet known, such as in an ad-hoc network, an initial provisioning of the UWB anchors 110 may be performed. In the provisioning, UWB anchors 110 may perform ranging measurements to determine relative distances (11-16) between UWB devices 110, as illustrated in FIG. 1A. This can enable the UWB anchors 110 to determine the relative locations with one another and, if the absolute location of any UWB anchor 110 is known, the absolute locations (e.g., with respect to a coordinates system). Once the positions of the UWB anchors 110 is known, the determination of location of a target 120 can be made by determining the distances (d1-d6) between the UWB anchors 110 and target 120. These distances can be determined using a variety of positioning-related measurements and/or procedures. This can include, for example, Reference Signal Time Difference (RSTD), Time of Arrival (ToA), two-way ranging (TWR) (e.g., including single-sided TWR (SS-TWR) and/or double-sided TWR (DS-TWR)), Time Difference of Arrival (TDoA), and more. Additionally or alternatively, angle-based measurements may be made for positioning of the target 120, including angle of arrival (AoA) and/or Angle of departure (AoD).

UWB anchors 110 may vary in form and function. In some embodiments, for example, a UWB anchor 110 may comprise a mobile device such as a mobile phone with UWB functionality. Similarly, anchors 110 may comprise other personal electronics, such as laptops, tablets, personal media players, or the like. Further, as noted, UWB devices may comprise vehicles, drones, robots, or other mobile devices that may move autonomously, and may be used in consumer, industrial, military, and/or other applications. UWB anchors 110 may also comprise proprietary and/or dedicated RF beacons deployed at known locations for monitoring the location of tags or devices used in logistical applications. This can be done, for example, to track packages, shipping containers, or the like. UWB anchors 110 may be used in proximity applications to, for example, unlock the door as a user (e.g., an authorized user) approaches. UWB anchors 110 may also be deployed in a factory setting to monitor robots, assembled parts, or the like. UWB anchors 110 may also be used in other applications and/or device types.

A group of UWB anchors 110 may conduct sessions in which UWB anchors 110 perform a series of operations to determine the position of one or more of the devices, and during which the UWB anchors 110 engage in direct communications (e.g., D2D communications) to coordinate the exchange of data, synchronize (e.g., for TDoA positioning). (As used herein, a "session" between devices may comprise a coordinated series of operations conducted by the devices to perform a task, such as positioning. Different types of sessions may include different operations. A session may be conducted in accordance with a relevant standard, may be identified with a session ID, may be conducted in parallel with other tasks (e.g., other sessions), or any combination thereof.) A group of UWB anchors 110 may be called a "cluster," and a network of UWB devices may comprise multiple clusters. Each cluster may include any number of UWB anchors 110, and different clusters may overlap, such that one or more UWB anchors 110 may be a part of one or more different clusters.

Figure 2A:
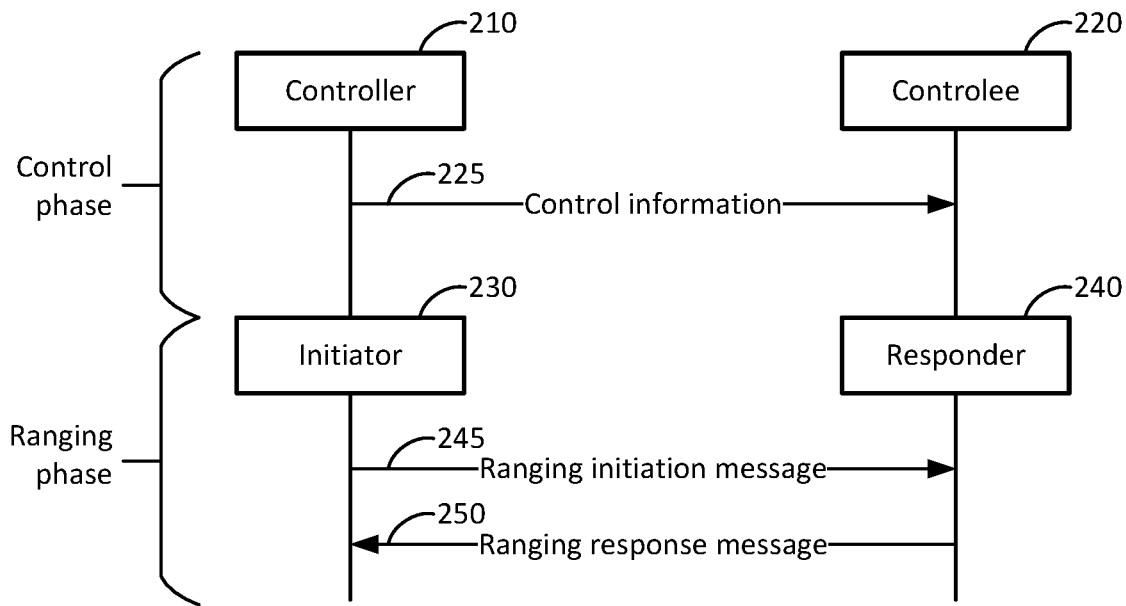
FIGS. 2A and 2B are a flow diagram illustrating the roles different UWB devices may assume with regard to a UWB ranging session, which comprises a control phase and a ranging phase.

FIG. 2A is a flow diagram illustrating the roles different devices may assume with regard to a UWB ranging session (or simply a "UWB session"), which may be conducted in accordance with a relevant UWB positioning standard (e.g., IEEE 802.15.4ab). Here, each UWB device may be referred to as an enhanced ranging device (ERDEV). ERDEVs may be referred to different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs).

As indicated, for a pair of ERDEVs communicating with each other, the controller 210 is an ERDEV that sends control information 225 to a receiving ERDEV, designated as the controlee 220. The control information 225 may include parameters for the UWB ranging session, such as timing, channel, etc. Although not illustrated, the controlee 220 can send acknowledgment to the control information 225, may negotiate changes to the parameters, and/or the like.

The exchange between controller 210 and controlee 220, including the sending of the control information 225 and subsequent related exchanges between controller 210 and controlee 220 regarding control information, may be conducted out of band (OOB) using a different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 210 and controlee 220 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round). Accordingly, some aspects of the control phase may be considered to occur in band, subsequent to the preliminary OOB exchange between the controller 210 and controlee 220.)

The UWB session may occur afterward, in accordance with the parameters provided in the control information. In the ranging phase of the UWB session, one ERDEV may take the role of an initiator 230 and the other ERDEV may take the role of a responder 240. As indicated in FIG. 2A, the initiator 230 may initiate UWB ranging by sending a ranging initiation message 245 to the responder 240, to which the responder 240 may reply with a ranging response message 250, and timing measurements may be made of these messages (by the devices receiving the messages) to perform two-way ranging (TWR). Depending on the parameters of the control information 225, additional exchanges may be made in the ranging phase between the initiator 230 and responder 240 to allow for additional ranging measurements.

Figure 2B:
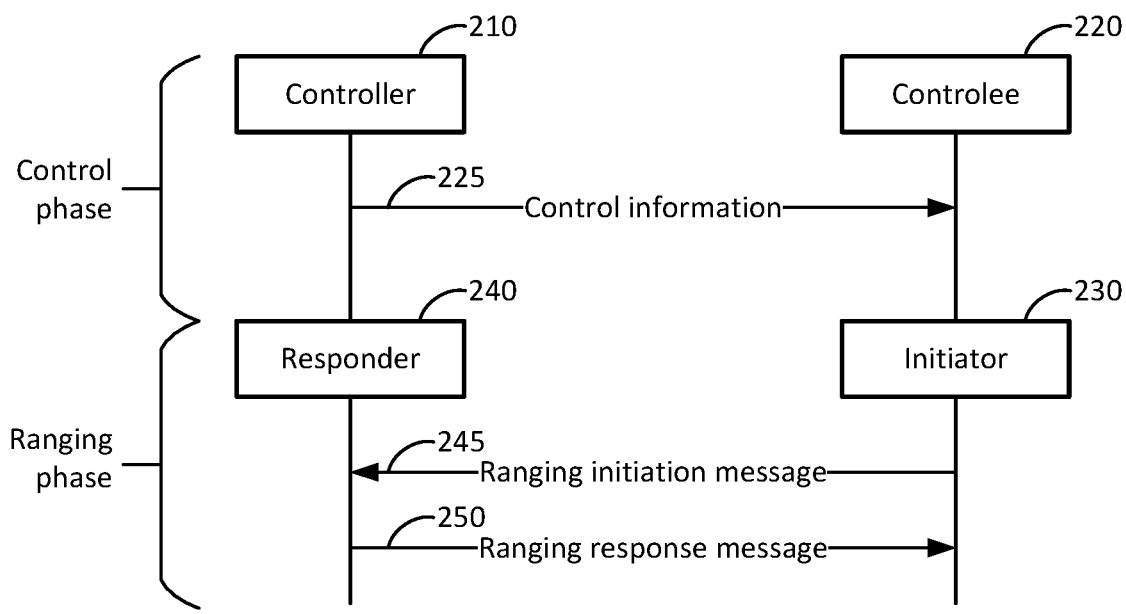

The roles of initiator 230 and responder 240 may be indicated in the control information 225. Further, as indicated in FIG. 2A, the controller 210 in the control phase may be the initiator 230 in the ranging phase of the UWB session. Alternatively, as indicated in FIG. 2B, the controller 210 in the control phase may be the responder 240 in the ranging phase. The determination of which device is initiator 230 and which is responder 240 may depend on the parameters set forth in the control information 225, in which case the controlee 220 correspondingly becomes either the responder 240 or the initiator 230. According to some embodiments, a controller/initiator may conduct ranging with multiple controlees/responders.

Figure 3:
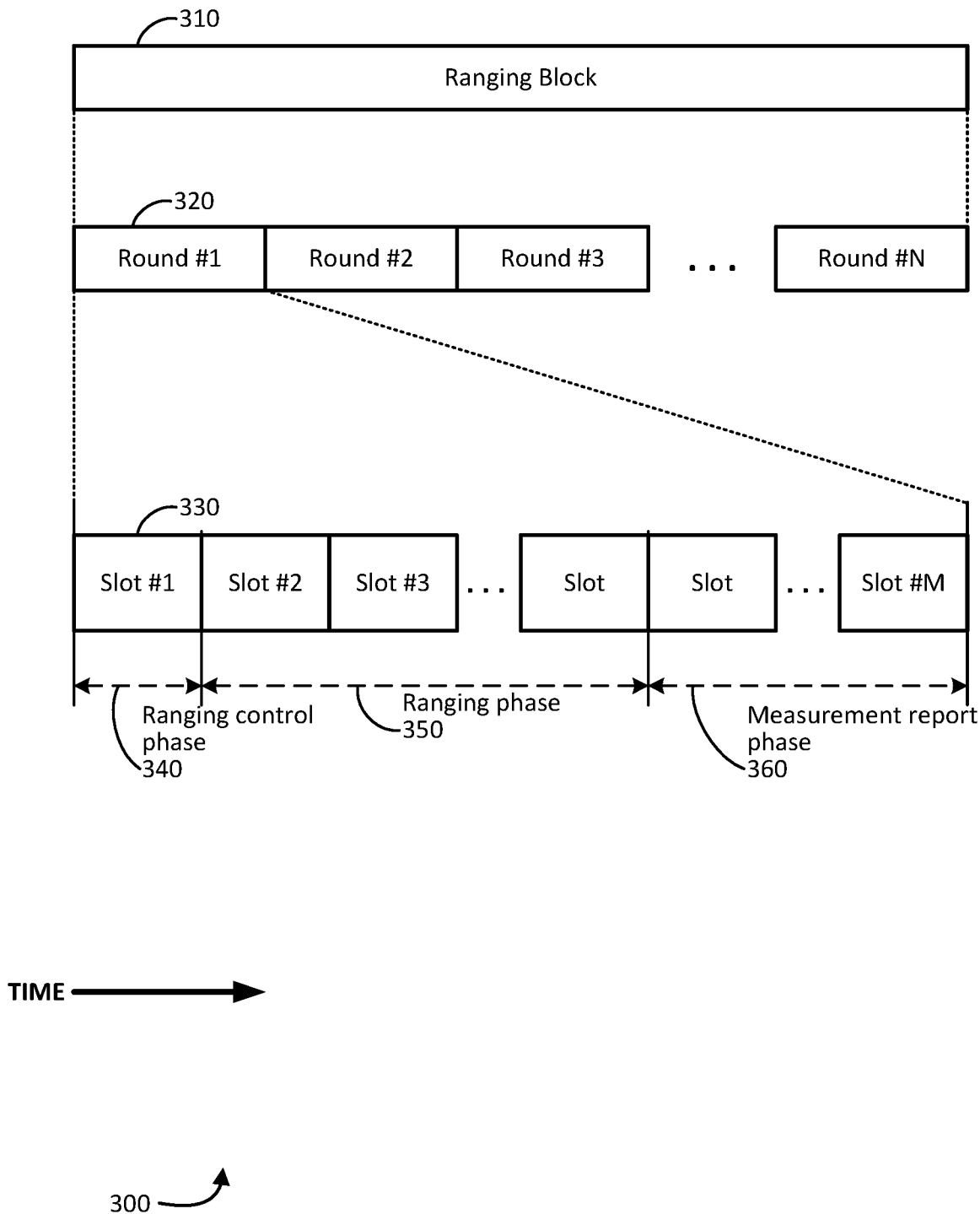
FIG. 3 is a timing diagram of how time may be measured and utilized within a UWB positioning session.

FIG. 3 is a diagram 300 illustrating how time may be segmented and utilized within a UWB positioning session, which may be used in some embodiments. A UWB session may occur over a period of time divided into sub-portions according to a hierarchical structure. This timing comprises one or more consecutive ranging blocks 310, which may have a configurable duration (e.g., 200 ms). (For simplicity, only one ranging block 310 is shown in FIG. 3. However, a UWB session may utilize multiple ranging blocks, which may occur in succession.) Each ranging block 310 may be split into one or more successive rounds 320 (e.g., N rounds). The number and length of the rounds may be configurable. The rounds 320 may be further split into different slots 330, which also may have a configurable number and length. According to some embodiments, to help reduce RF collisions, each cluster of UWB anchors may use a single round in each ranging block 310 for UWB positioning. Neighboring clusters may utilize different rounds.

The slots within a round 320 may be allocated for different purposes. For example, the initial slot may be dedicated as the ranging control phase 340, in which an initiator UWB anchor for the cluster, or Init-Anchor, transmits control information for the other UWB anchors in the cluster. This information can include, for example, an allocation of slots among the different UWB anchors of the cluster. During the subsequent ranging phase 350, the different UWB anchors may transmit in accordance with the allocated slot. That is, each anchor may be allocated a corresponding slot in the ranging phase 350 to transmit one or more ranging signals. The ranging phase 350 may be followed by a measurement report phase 360 in which UWB anchors in a cluster may report measurements (e.g., of signals measured during the ranging phase 350).

Figure 4A:
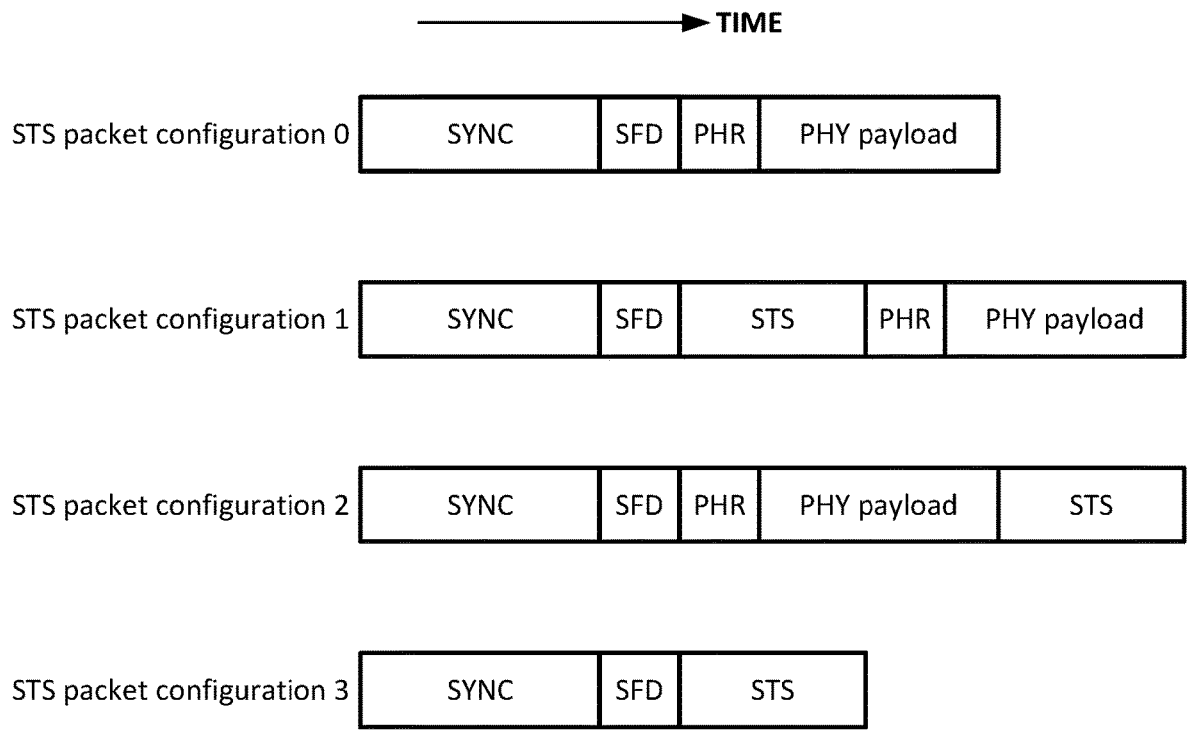
FIG. 4A is illustration of different packet configurations that can be used in a UWB session at the UWB physical (PHY) layer.

FIG. 4A is an illustration of different packet configurations that can be used in a UWB session at the UWB physical (PHY) layer, which may be used in some embodiments. These packet configurations may be defined and/or used in relevant UWB standards (e.g., IEEE 802.15.4z). As shown, ranging functionality may be based on channel estimation using the SYNC preamble, included in each of the for possible configurations (e.g., configurations 0-3) used in current configurations. (Configuration 0 is currently used as a default configuration.) The SYNC preamble may comprise a bit sequence (such as a Ipatov ternary sequence, Gold sequence, Golay sequence, polyphase sequence like Zadoff-Chu sequence, etc.) that exhibits good autocorrelation properties (e.g., sufficient for ranging measurements). As illustrated, the different packet configurations may also include a start of frame delimiter (SFD) to help demarcated the SYNC preamble from the rest of the packet, a PHY payload for conveying data (e.g., for communication, time stamp information, etc.), and/or a scrambled timestamp sequence (STS). The STS is a security feature with a unique sequence known to transmitter and receiver, which can authenticate the data packet source and help prevent over-the-air attacks that can falsify a ToA estimate for ranging in a UWB session. This aspect of UWB ranging is described in more detail with regard to FIG. 4B.

Figure 4B:
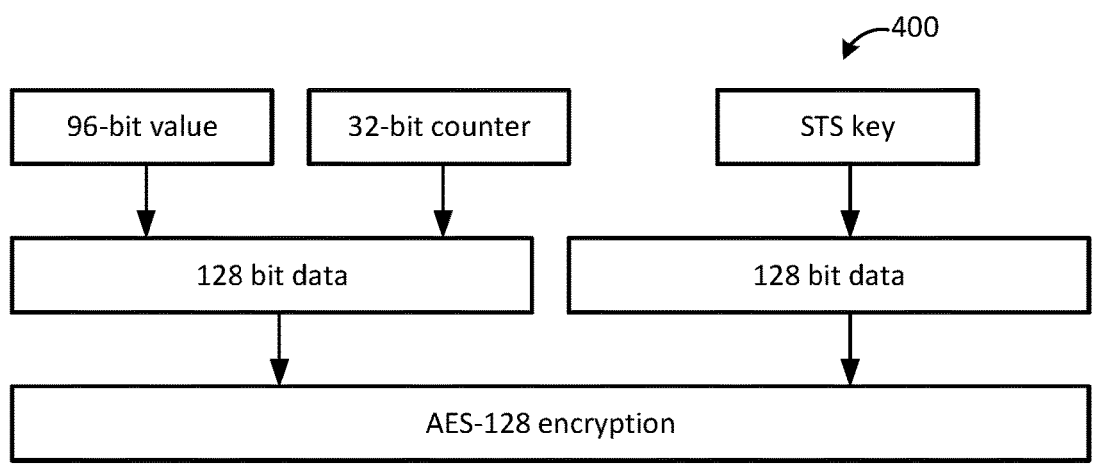
FIG. 4B is an illustration of a deterministic random bit generator (DRBG) that can be used to generate an scrambled timestamp sequence (STS).

FIG. 4B is an illustration of a deterministic random bit generator (DRBG) 400 that can be used to generate an STS, which may be used in some embodiments. Here, the DRBG 400 is based on Advanced Encryption Standard (AES)-128 in counter mode. As illustrated, the DRBG 400 uses a 96-bit value, a 32-bit counter, and an STS key. The STS key may be exchanged securely between ERDEVs (e.g., an initiator and one or more responders) prior to the UWB session. For example, an STS key may be provided by the controller (e.g., controller 210 of FIG. 2A or 2B), for example, at the application layer over a secure link (e.g., an OOB link).

Despite security measures provided by STS, STS is not used in all STS packet configurations (e.g., STS packet configuration 0). Even if STS is present, security may still further be enhanced. Moreover, UWB sessions utilizing any of the STS packet configurations of FIG. 3A still may be vulnerable to interference, even in view of interference-mitigating procedures described with regard to FIG. 3. Interference may be particularly problematic in environments in which multiple simultaneous UWB connections are employed.

To address these and other issues, embodiments herein utilize zero-power symbols when transmitting data packets, such as STS packets, for UWB-based positioning. Depending on desired functionality, the number, length, or placement, or any combination thereof, may be random (or, more precisely, pseudo-random, because they are known to initiator and responder), thereby helping to mitigate attacks and/or periodic interference. The random features (number, length, and/or placement) fixed by a higher-layer parameter, or may be generated using a random seed, and may be generated using an algorithm similar to the DRBG 400 of FIG. 4B. Further, because these additional symbols are zero power, a receiving device can take measurements during the symbols to determine the presence of an attack and/or interference. As described hereafter, these zero-power symbols, also described herein as interference measurement resources (IMRs), can be inserted in one or more different components of an STS packet (PHR, payload, etc.), depending on desired functionality.

FIGS. 5A and 5B are timing diagrams illustrated to show an example of how IMRs may be used in STS packet configuration 0. FIG. 5A shows a traditional STS packet 500 having the components used in STS packet configuration 0: a preamble 510, SFD 520, PHR 530, and payload 540. With respect to PHR 530 and payload 540, individual symbols within these components are illustrated to help illustrate the relationship between the various packet components and individual symbols. Callouts are provided to show close-ups of the first two PHR symbols at blocks 550 and the last two payload symbols at blocks 560, showing the sequential nature of symbols within packet components.

FIG. 5B illustrates how the STS packet 500 of FIG. 5A may be modified, according to some embodiments. As illustrated, the modified STS packet 565 has the same components as the traditional STS packet 500. However, multiple IMRs 570 have been inserted into the PHR 530 and the payload 540. As previously noted, a receiving device (e.g., responder) can listen during the zero-power IMRs 570 to determine whether an attacker and/or interference is present. For example, if measured power during one or more of the IMRs 570 exceeds a threshold (e.g., a threshold related to a noise floor) that the presence of interference and/or an attacker can be inferred.

FIGS. 6A and 6B are timing diagrams illustrated to show an example of how IMRs may be used in STS packet configuration 3. Similar to FIG. 5A, FIG. 6A shows a traditional STS packet 600 having the components used in STS packet configuration 3: a preamble 610, SFD 620, and STS 630. Here, the individual symbols of the STS 630 are illustrated, along with the gaps 640 and 650 preceding and following the STS 630. Callouts are provided to show close-ups of a first gap 640 followed by the first STS symbol 660, along with the last STS symbol 670 preceding a second gap 650. As described in more detail below, these gaps can be used as timing references for IMRs.

FIG. 6B illustrates how the STS packet 600 of FIG. 6A may be modified, according to some embodiments. As illustrated, the modified STS packet 680 has the same components as the traditional STS packet 600. However, multiple IMRs 690 have been inserted into the STS 630. It can be noted that, in both FIGS. 5B and 6B, the insertion of zero-power symbols can extend the length of the STS packet. For example, the insertion of seven IMRs 690 in modified STS packet 680 can cause the packet to be seven symbols longer. In other words, the modified STS packet 680 retains all of the data from the STS packet 600, but further includes additional symbols comprising IMRs 690.

It will be understood that FIGS. 5A-6B are provided as examples only, and the number, length, and location of IMRs 570 and 690 may vary from instance to instance. Further, although the examples in FIGS. 5A-6B show STS configurations 0 and 3, STS configurations 1 and 2 may be modified in a similar manner. Thus, embodiments may apply to any STS configuration.

Moreover, IMRs may be used in s narrowband (NB)-assisted UWB, according to some embodiments. NB-assisted UWB is a feature that is being developed to utilize a different packet structure than STS configurations 0-3 to perform, for example, time and frequency synchronization that may be used for ranging. FIG. 7A illustrates a timing diagram 700 showing a traditional series of NB-assisted UWB communications comprising and initial NB packet 710 used for timing and frequency synchronization estimation followed by a series of periodically-repeating packets comprising a preamble 720. FIG. 7B illustrates a similar timing diagram 730, modified to include IMRs 740, in accordance with embodiments herein. As shown in FIG. 7B, each preamble 720 in the modified sequence may include a unique set of IMRs 740, with a corresponding unique number, location, or duration of IMRs 740, or any combination thereof.

The location, length, or number (or any combination thereof) of the IMRs used to modify and STS packet, may be pseudo-random, in accordance with an algorithm known to transmitter and receiver. For example AES-128 may be used to generate a random number known to transmitter and receiver due to the same random seed. Then any arbitrary rule can be used to get the location, length, and/or number of the IMRs from a generated random number. (For example, from a random 128-bit number, the first 42 bits may be used for the location, the second 42 bits for length, and the last 44 bits for the number of IMRs.) According to some embodiments, the length may be defined as a multiple of a minimum length. In some embodiments, the minimum length may be defined by symbol length, for example, in which case the duration of each IMR may be a multiple of a symbol (e.g., one symbol long, two symbols long, etc.). Additionally or alternatively, a gap between an SFD and STS (e.g., gap 640) may be used as a reference length, in which case the duration of each IMR may be defined in reference to the gap (e.g., 0.25, 0.5, 2, or 3 times as long, etc.). Similar to AES-128 used for STS a seed or key may be communicated between devices beforehand (e.g., sent to a responder from an initiator or to a controlee from a controller), via an OOB communication link, for example.

For its part, the receiver of the modified packets (e.g., responder in the UWB session) may perform one or more operations to complement the functionality of the transmitter. As previously noted, the receiver can perform measurements of RF signals (e.g., of received power) during one or more of the IMRs to determine whether interference is present, for example, if received power exceeds a noise floor threshold. (A noise floor threshold can be determined from the measurement of amplifier (e.g., RFA) characteristics as a calibration step and/or estimated by measuring the received power of IMRs without interference as an calibration step. Also there are many signal processing algorithms can measure this noise power floor in a calibration step.) In some embodiments, these measurements may be performed over multiple IMRs, in which case average measurements may be compared against threshold to determine the presence of an attacker or other interference.

If interference is present, as determined based on these measurements, the receiver can engage in one or more responses. For example, if interference is determined to be present during the transmission of a packet (again, based on measurements taken during IMRs of the packet), then the receiver can simply disregard the packet. This may involve, for example, behaving as though the receiver did not receive the packet or was unable to decode the packet due to interference. Such behavior may be governed, for example, by applicable standards (such as IEEE 802.15.4ab) for the transmission of the UWB packet.

Additionally or alternatively, the receiver may inform the transmitter of the packet and/or apply mitigation techniques. Informing the transmitter of the interference can allow the transmitter to perform mitigation techniques, such as using a different channel a different slot/round, etc., which can be communicated to the receiver during a control phase, for example. The receiver may also apply mitigation techniques such as interference whitening based on a covariance matrix. As such, the receiver may, in addition or as an alternative to informing the transmitter of the packet, provide an internal notification of detection of the interference to cause the receiver to perform such interference mitigation techniques. Additional details regarding interference detection are provided hereafter with respect to FIG. 8.

Figure 8:
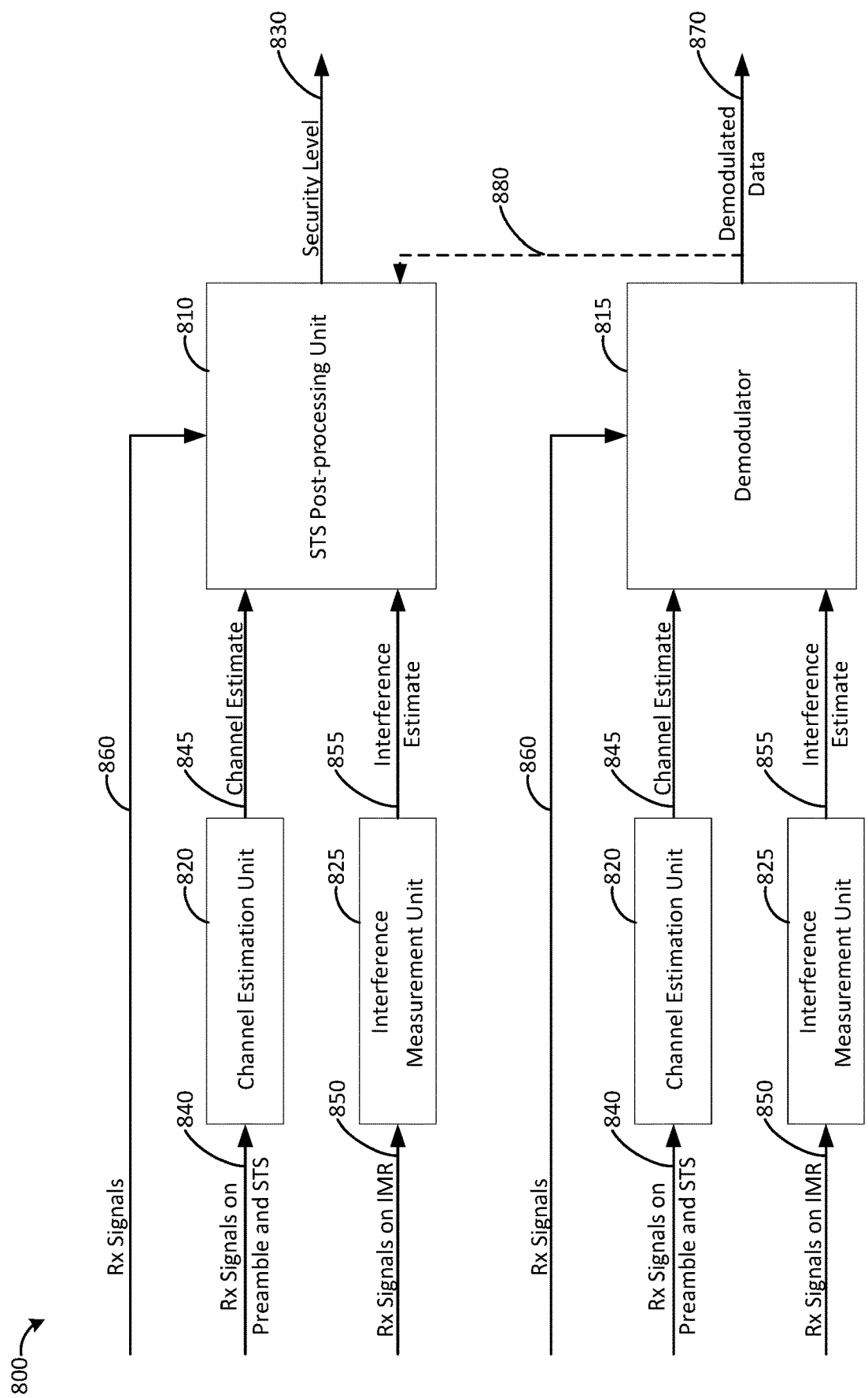
FIG. 8 is a block diagram of processing components of a UWB receiver, according to an embodiment.

FIG. 8 is a block diagram of processing components 800 of a UWB receiver to enable the UWB receiver to process STS packets that a been modified in the manner shown in the previously-described embodiments, according to an embodiment. These processing components 800 may be implemented in hardware and/or software components of a UWB device, such as the one shown in FIG. 11. In particular, processing components 800 may be implemented in a UWB transceiver 1135 of a wireless communication interface 1130, one or more processors 1110, a standalone digital signal processor (DSP) 1120, or any combination thereof. In the processing components 800 of FIG. 8, processing is divided into two different parts: security level processing that may be performed by an STS post-processing unit 810 and demodulation that may be performed by a demodulator 815. Duplicative components (e.g., channel estimation unit 820 and/or interference measurement unit 825) may be separated (as shown) or shared, depending on desired functionality.

The STS post-processing unit 810 outputs a security level 830 indicative of a security or integrity level. This output is based on various inputs. The channel estimation unit 820 receives RF signals 840 of traditional (non-zero-power symbols) symbols and outputs a channel estimate 845 indicative of a metric of a transmitted symbol. This can be done, for example, by using non-zero-power resources such as preamble and/or STS regions to estimate channel. The channel estimate 845 can be used with IMRs to estimate noise floor of the particular packet. One metric that may be used, for example, is SINR defined as $$\text{SINR} = \frac{|h_k|^2}{\sigma_z^2}, \quad (1)$$

where $h_k$ is the channel estimate by suing preamble and/or STS and a is a measure of noise floor.

The interference measurement unit 825 can do something similar, but with IMRs rather than traditional symbols. That is, the interference measurement unit 825 may receive Rx signals measured during IMRs (Rx signals on IMR 850) and output an interference estimate 855, indicative of a metric of the zero-power symbol by comparing the channel estimate 845 and interference estimate 855, the STS post-processing unit 810 may then determine whether interference is present. For example, using an estimate of average symbol power from the channel estimate 845 and an estimate of average power received during a zero-power symbol from the interference estimate 855 the STS post-processing unit 810 may determine a signal to interference and noise ratio (SINR) that can be used to derive the security level 830. The Rx signals 860 may be provided directly to the STS post-processing unit 810 to enable the STS post-processing unit 810 to provide a reliability metric, which may be based, in part, on the Rx signals 860. For example, mutual information may comprise one such reliability metric that utilizes Rx signals. This mutual information can be used as one parameter for determining security level of 830. The details equation for mutual information is given by:

$$\mu = 1 - \frac{1}{K} \sum_{k=0}^{K-1} \log_2\left(1 + \exp\left(-x_k \frac{4\Re\{h_k^* y_k\}}{\sigma_z^2}\right)\right), \quad (2)$$

where $h_k^*$ is the channel estimate, $y_k$ is the Rx signals, $x_k$ is the modulated data, and $\sigma_z^2$ is the interference measurement.

Further, as indicated by dashed arrow 880, embodiments may optionally provide demodulated data 870 to the STS post-processing unit 810, because the demodulated data 870 can be informative to the security level 830. For example, the number of decision errors is one metric to check the reliability (bit errors or symbol errors). Also a distance commitment protocol is defined in the relevant IEEE standard. Both of these may use the demodulated data 880.

The content of the security level 830 may vary, depending on desired functionality. According to some embodiments, security level may comprise a single bit that indicates whether interference (e.g., relative to signal power) has exceeded a certain threshold. If interference is above a threshold, the security level 830 may indicate a "low" security level. If interference is below a threshold, the security level 830 may indicate a "high" security level. Some embodiments may include multiple security levels (e.g., indicated by two or more bits), which may indicate a level or degree of interference measured by the receiver, which may be relative to signal power. As such, the security level 830 can be an indication of the integrity of data received via the Rx signals.

As also shown in FIG. 8, the demodulator 815 can use the same inputs to process the RF signals 860 to provide the demodulated data 870. In cases where interference has been detected and the receiver implements interference mitigation, the demodulator 815 can use the channel estimate 845 and interference estimate 855 to implement interference mitigation, such as interference whitening. The demodulated data 870 may include the content of a received payload from an STS packet, and may be used to inform an ACK or NACK response by the receiver.

The security level 830 and demodulated data 870 may be used by, for example, a higher-level function or additional component (not shown) to determine whether to further process the demodulated data. For example, if a security level 830 indicates that interference is present and the integrity of the demodulated data 870 may be compromised (e.g., the security level has dropped below a threshold), then the receiver may choose to discard the demodulated data (and/or notify the transmitter, implement interference mitigation techniques, etc.) as previously discussed.

Figure 9:
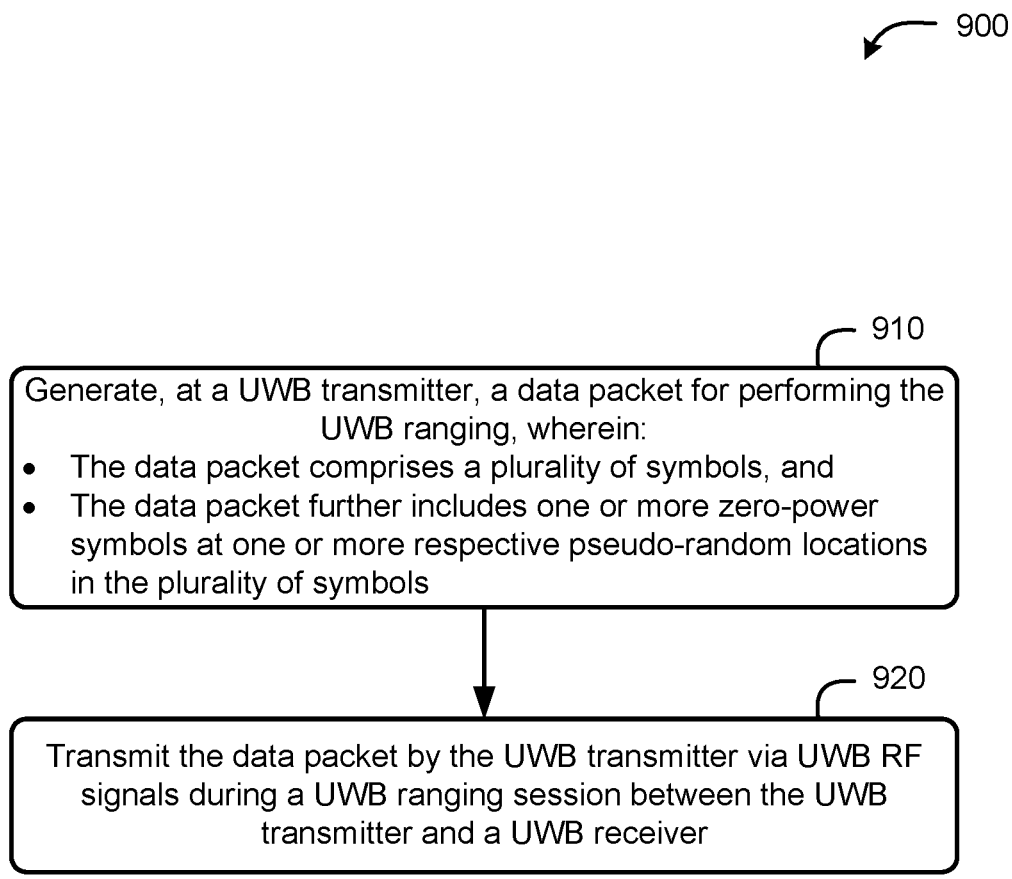
FIG. 9 is a flow diagram of a method 900 of enabling secure UWB ranging, according to an embodiment.

FIG. 9 is a flow diagram of a method 900 of enabling secure UWB ranging, according to an embodiment. Means for performing the functionality illustrated in one or more of the blocks shown in FIG. 9 may be performed by hardware and/or software components of a UWB device. This method 900 may occur as part of a UWB ranging session as described, for example, with respect to FIGS. 1-3, and may correspond with functionality of a UWB transmitter. Example components of a UWB device are illustrated in FIG. 11, which is described in more detail below.

At block 910, the functionality comprises generating, at a UWB transmitter, a data packet for performing the UWB ranging, wherein the data packet comprises a plurality of symbols, and the data packet further includes one or more zero-power symbols at one or more respective pseudo-random locations in the plurality of symbols. As previously noted, a UWB transmitter may comprise a controller (e.g., controller 210 of FIG. 2A or 2B) and/or initiator (e.g., initiator 230 of FIG. 2A or 2B) UWB device in a UWB ranging session. As described with regard to FIGS. 5A-6B the data packet may comprise a UWB STS packet (e.g., any of STS packet configurations 0-3), with the corresponding UWB STS packet components. As such, in some embodiments of the method 900, the data packet may comprise a UWB STS packet, and the one or more zero-power symbols may be included in a PHR of the data packet, a payload of the data packet, an STS portion of the data packet, or any combination thereof. Additionally or alternatively, as described with respect to FIGS. 7A-7B, in some embodiments the data packet may comprise a narrow band (NB)-assisted UWB preamble.

Figure 11:
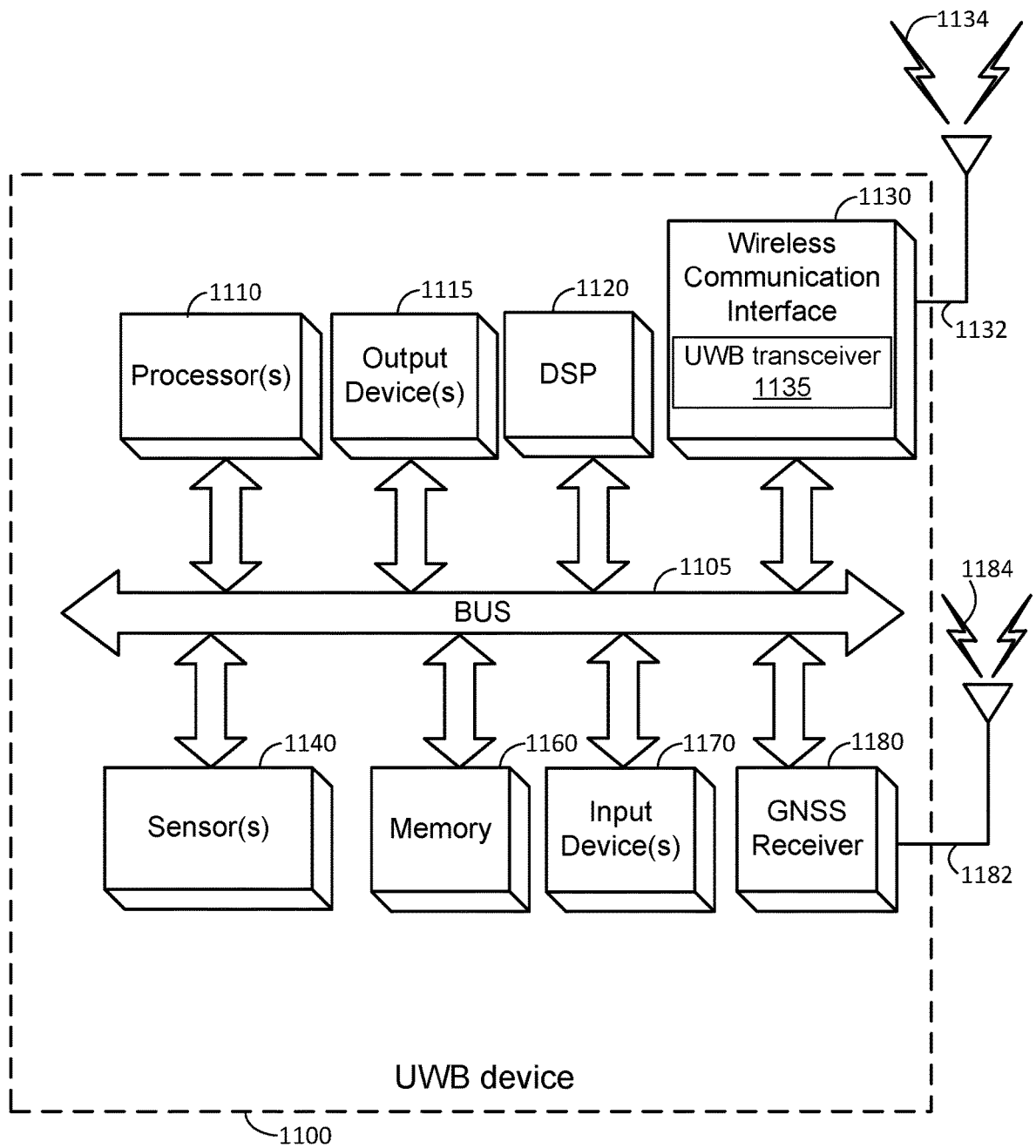
FIG. 11 is a block diagram of an embodiment of a UWB device.

Means for performing functionality at block 910 may comprise a bus 1105, processor(s) 1110, DSP 1120, wireless communication interface 1130 (including UWB transceiver 1135) memory 1160, and/or other components of a UWB device 1100, as illustrated in FIG. 11.

At block 920, the functionality comprises transmitting the data packet with the UWB transmitter via UWB RF signals during a UWB ranging session between the UWB transmitter and a UWB receiver. As noted in the above-described embodiments, the data packet may be measured by the UWB receiver to perform a ranging measurement. Further, as also noted, characteristics of the zero-power symbols (e.g., IMRs), such as number, location, and duration, may be dictated by using one or more algorithms. In some embodiments a single algorithm may be capable of providing multiple pseudo-random characteristics (e.g., a single algorithm may be used to generate one or more pseudo-random numbers to determine the number, location, and duration, or any combination thereof). In other embodiments, different algorithms may be used to generate different pseudo-random characteristics. As such, some embodiments of the method 900 may comprise determining a characteristic of the one or more zero-power symbols in accordance with a predetermined algorithm, wherein the characteristic comprises a number of the one or more zero-power symbols, the respective one or more pseudo-random locations of the one or more zero-power symbols within the data packet, a respective length of each of the one or more zero-power symbols, or any combination thereof. Such embodiments may further comprise determining a seed value for the predetermined algorithm and sending the seed value to the UWB receiver. As previously noted, the sending of the seed value to the UWB receiver may occur prior to the UWB ranging session and/or may be communicated to the UWB receiver via OOB communications.

Some embodiments may further involve responding to detected interference. For example, some embodiments of the method 900 may comprise, subsequent to transmitting the data packet, receiving a message from the UWB receiver indicating that RF interference has been detected, and, responsive to receiving the message from the UWB receiver indicating that the RF interference has been detected, increasing a number of STS symbols, providing assistance data to the UWB receiver regarding an a priori distance, providing an indication of the RF interference to an application layer, ending the UWB ranging session, or any combination thereof. Depending on desired functionality, the content of the message may vary. In some embodiments, the UWB receiver may indicate a particular level of interference. In some embodiments, the new WB receiver may simply indicate that interference has been detected. With regard to ending the UWB ranging session, the UWB transmitter may end of the UWB ranging session in accordance with any applicable governing standards or protocols. Regarding increasing the number of STS symbols, this can enable a UWB receiver to mitigate interference by averaging out the interference, for example. By providing assistance information regarding an a priori distance, this can be used by the UWB receiver as a constraint on distance measurements. Finally, providing RF interference detection as feedback information to an application layer can allow decisions to be made by one or more applications themselves.

Means for performing functionality at block 920 may comprise a bus 1105, processor(s) 1110, DSP 1120, wireless communication interface 1130 (including UWB transceiver 1135) memory 1160, and/or other components of a UWB device 1100, as illustrated in FIG. 11.

Figure 10:
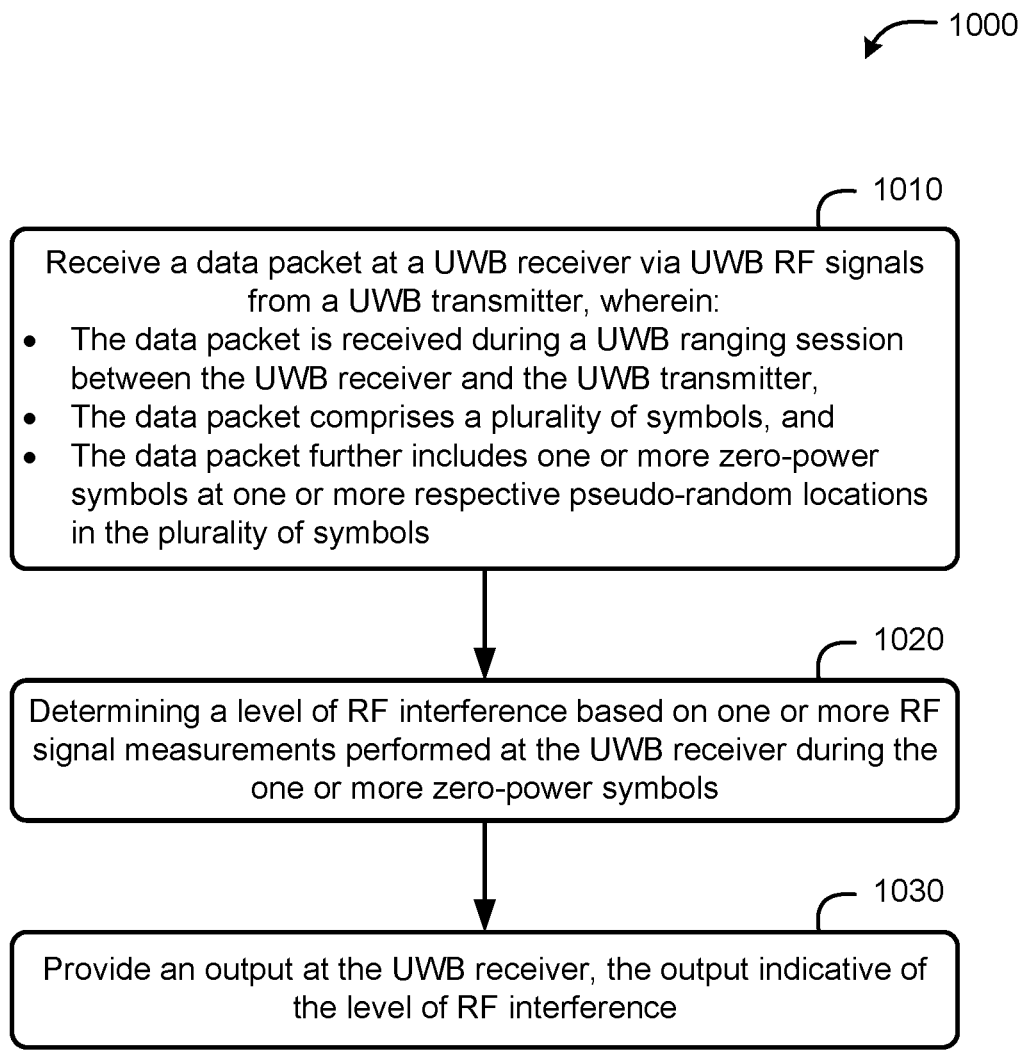
FIG. 10 is a flow diagram of a method 1000 of enabling secure UWB ranging, according to an embodiment.

FIG. 10 is a flow diagram of a method 1000 of enabling secure UWB ranging, according to an embodiment. Means for performing the functionality illustrated in one or more of the blocks shown in FIG. 10 may be performed by hardware and/or software components of a UWB device. Similar to the method 900 of FIG. 9, this method 1000 may occur as part of a UWB ranging session as described, for example, with respect to FIGS. 1-3, and may correspond with functionality of a UWB receiver. Example components of a UWB device are illustrated in FIG. 11, which is described in more detail below.

At block 1010, the functionality comprises receiving a data packet at a UWB receiver via UWB RF signals from a UWB transmitter, wherein the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols. In some embodiments, the data packet may comprise a UWB STS packet, and wherein the one or more zero-power symbols are included in a PHR of the data packet, a payload of the data packet, an STS portion of the data packet, or any combination thereof. In some embodiments, the data packet may comprise an NB assisted UWB preamble.

Similar to the UWB transmitter, the UWB receiver may use a predetermined algorithm for determining one or more pseudo-random characteristics of the zero-power symbols (e.g., IMRs). As such, some embodiments of the method 1000 may further comprise determining a characteristic of the one or more zero-power symbols in accordance with a predetermined algorithm, wherein the characteristic comprises a number of the one or more zero-power symbols, the respective one or more pseudo-random locations of the one or more zero-power symbols within the data packet, a respective length of each of the one or more zero-power symbols, or any combination thereof. In such embodiments, the method 1000 may further comprise receiving, from the UWB transmitter, a seed value for the predetermined algorithm.

Means for performing functionality at block 1010 may comprise a bus 1105, processor(s) 1110, DSP 1120, wireless communication interface 1130 (including UWB transceiver 1135) memory 1160, and/or other components of a UWB device 1100, as illustrated in FIG. 11.

At block 1020, the functionality comprises determining a level of RF interference based on one or more RF signal measurements performed at the UWB receiver during the one or more zero-power symbols. As noted in the previously-described embodiments, this can be done to determine whether there is RF interference. Measurements may include, for example, a maximum power level, an average power level, a power spectral density (PSD), or the like, for RF signals measured during the one or more zero-power symbols. According to some embodiments statistical information such as covariance and/or correlation information between samples in time and/or samples in multiple antennas can be further obtained.

Means for performing functionality at block 1020 may comprise a bus 1105, processor(s) 1110, DSP 1120, wireless communication interface 1130 (including UWB transceiver 1135) memory 1160, and/or other components of a UWB device 1100, as illustrated in FIG. 11.

At block 1030, the functionality comprises providing an output at the UWB receiver, the output indicative of the level of RF interference. As previously described with respect to FIG. 8, this output may be internal to the UWB receiver. For example, in some embodiments, providing the output comprises providing the output at an STS post-processing unit (e.g., STS post-processing unit 810 of FIG. 8) of the UWB receiver. As noted, an STS post-processing unit of the UWB receiver may comprise a hardware and/or software component of the UWB receiver used for processing UWB signals. As such, the STS post-processing unit may be implemented within a UWB transceiver (e.g., UWB transceiver 1135) and/or wireless communication interface (e.g., wireless communication interface 1130) of a UWB device.

Means for performing functionality at block 1030 may comprise a bus 1105, processor(s) 1110, DSP 1120, wireless communication interface 1130 (including UWB transceiver 1135) memory 1160, and/or other components of a UWB device 1100, as illustrated in FIG. 11.

As described in the embodiments herein, a UWB receiver may implement one or more additional features. For example, according to some embodiments of the method 1000, performing the one or more RF signal measurements may comprise performing one or more measurements of RF signal power during the one or more zero-power symbols. In such embodiments, the method 1000 may further comprise performing one or more measurements of RF signal power during one or one or more non-zero-power symbols and determining the level of RF interference by comparing RF signal power during the one or more zero-power symbols with RF signal power during one or one or more non-zero-power symbols. Here, the non-zero-power symbols may comprise one or more symbols of the data packet that are not zero-power symbols. This may include symbols from symbols from a component of the data packet (e.g., payload, STS, PHR, preamble) that also includes zero-power symbols, and/or symbols from the entire data packet.

As noted, a UWB receiver may take one or more actions when determining whether RF interference is present. As such, some embodiments of the method 1000 may further comprise determining the level of RF interference exceeds a minimum threshold and, responsive to determining the level of RF interference exceeds a minimum threshold, (i) sending a message to the UWB transmitter indicating that RF interference has been detected, (ii) disregarding demodulated data from the data packet, (iii) implementing interference mitigation for processing the data packet, or any combination of (i)-(iii).

FIG. 11 is a block diagram of an embodiment of a UWB device 1100 which can be utilized as described herein, including a UWB transmitter, receiver, initiator, responder, controller, controlee, or any combination thereof. It should be noted that FIG. 11 is meant only to provide a generalized illustration of various components, any or all of which may be utilized as appropriate. For example, more basic/simple types of UWB devices may omit various components that may be included in more advanced/complex UWB devices. Mobile UWB devices may include some components that are not in stationary UWB devices (e.g., Global Navigation Satellite System (GNSS) receiver 1180), and vice-versa. Furthermore, as previously noted, the functionality of the UE discussed in the previously described embodiments may be executed by one or more of the hardware and/or software components illustrated in FIG. 11.

The mobile UWB device 1100 is shown comprising hardware elements that can be electrically coupled via a bus 1105 (or may otherwise be in communication, as appropriate). The hardware elements may include processor(s) 1110 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1110 may comprise one or more processing units, which may be housed in a single integrated circuit (IC) or multiple ICs. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The mobile UWB device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile UWB device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1100 to communicate with other devices as described herein. The wireless communication interface 1130 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

As illustrated, the wireless communication interface 1130 may further comprise a UWB transceiver 1135. The UWB transceiver 1135 may be operated to perform the UWB operations described herein, and/or may implement functions shown by UWB hardware and/or software components previously described (e.g., with respect to FIG. 8). Further, the wireless communications interface 1130 may comprise one or more additional communication technologies with which any OOB functionalities described herein may be performed. According to some embodiments, the UWB transceiver 1135 may be one of a plurality of UWB transceivers of the mobile UWB device 1100. Further, the UWB transceiver may be used for functionality in addition to the UWB ranging or positioning functionality described herein. Although illustrated as part of the wireless communication interface 1130, the UWB transceiver 1135 may be separate from the wireless communication interface 1130 in some embodiments.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1100 can further include sensor(s) 1140. Sensor(s) 1140 may comprise, without limitation, one or more inertial sensors and/or other sensors (e.g., accelerometer(s), gyro scope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the UWB device 1100 using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1180 can be used with various+storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile UWB device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile UWB device 1100 (and/or processor(s) 1110 or DSP 1120 within mobile UWB device 1100). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of enabling secure ultra-wideband (UWB) ranging, the method comprising: generating, at a UWB transmitter, a data packet for performing the UWB ranging, wherein: the data packet comprises a plurality of symbols, and the data packet further includes one or more zero-power symbols at one or more respective pseudo-random locations in the plurality of symbols; and transmitting the data packet by the UWB transmitter via UWB radio frequency (RF) signals during a UWB ranging session between the UWB transmitter and a UWB receiver.

Clause 2. The method of clause 1, wherein the data packet comprises a UWB scrambled timestamp sequence (STS) packet, and wherein the one or more zero-power symbols are included in: a physical layer header (PHR) of the data packet, a payload of the data packet, an STS portion of the data packet, or any combination thereof.

Clause 3. The method of any one of clauses 1-2 wherein the data packet comprises a narrow band (NB)-assisted UWB preamble.

Clause 4. The method of any one of clauses 1-3 further comprising determining a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 5. The method of clause 4 further comprising determining a seed value for the predetermined algorithm; and sending the seed value to the UWB receiver.

Clause 6. The method of any one of clauses 1-5 further comprising subsequent to transmitting the data packet, receiving a message from the UWB receiver indicating that RF interference has been detected; and responsive to receiving the message from the UWB receiver indicating that the RF interference has been detected: increasing a number of STS symbols, providing assistance data to the UWB receiver regarding an a priori distance, providing an indication of the RF interference to an application layer, ending the UWB ranging session, or any combination thereof.

Clause 7. A method of enabling secure ultra-wideband (UWB) ranging, the method comprising: receiving a data packet at a UWB receiver via UWB radio frequency (RF) signals from a UWB transmitter, wherein: the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols; determining a level of RF interference based on one or more RF signal measurements performed at the UWB receiver during the one or more zero-power symbols; and providing an output at the UWB receiver, the output indicative of the level of RF interference.

Clause 8. The method of clause 7, wherein performing the one or more RF signal measurements comprises performing one or more measurements of RF signal power during the one or more zero-power symbols.

Clause 9. The method of clause 8 wherein the one or more measurements of RF signal power comprise: a maximum power level, an average power level, a power spectral density (PSD), or any combination thereof.

Clause 10. The method of any one of clauses 8-9 further comprising performing one or more measurements of RF signal power during one or more non-zero-power symbols; and determining the level of RF interference by comparing RF signal power during the one or more zero-power symbols with RF signal power during one or more non-zero-power symbols.

Clause 11. The method of any one of clauses 7-10 wherein providing the output comprises providing the output at a scrambled timestamp sequence (STS) post-processing unit of the UWB receiver.

Clause 12. The method of any one of clauses 7-11 further comprising determining that the level of RF interference exceeds a minimum threshold; and responsive to determining that the level of RF interference exceeds the minimum threshold, sending a message to the UWB transmitter indicating that RF interference has been detected.

Clause 13. The method of any one of clauses 7-12 further comprising determining that the level of RF interference exceeds a minimum threshold; and responsive to determining the level of RF interference exceeds the minimum threshold, disregarding demodulated data from the data packet.

Clause 14. The method of any one of clauses 7-13 further comprising determining the level of RF interference exceeds a minimum threshold; and responsive to determining that the level of RF interference exceeds the minimum threshold, implementing interference mitigation for processing the data packet.

Clause 15. The method of any one of clauses 7-14 wherein the data packet comprises a UWB STS packet, and wherein the one or more zero-power symbols are included in: a physical layer header (PHR) of the data packet, a payload of the data packet, an STS portion of the data packet, or any combination thereof.

Clause 16. The method of any one of clauses 7-15 wherein the data packet comprises a narrow band (NB)-assisted UWB preamble.

Clause 17. The method of any one of clauses 7-16 further comprising determining a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 18. The method of clause 17 further comprising receiving, from the UWB transmitter, a seed value for the predetermined algorithm.

Clause 19. A ultra-wideband (UWB) transmitter for enabling secure UWB ranging, the UWB transmitter comprising: a transceiver; a memory; and one or more processors communicatively coupled with the transceiver and the memory, wherein the one or more processors are configured to: generate a data packet for performing the UWB ranging, wherein: the data packet comprises a plurality of symbols, and the data packet further includes one or more zero-power symbols at one or more respective pseudo-random locations in the plurality of symbols; and transmit the data packet with the transceiver via UWB radio frequency (RF) signals during a UWB ranging session between the UWB transmitter and a UWB receiver.

Clause 20. The UWB transmitter of clause 19, wherein, to generate the data packet, the one or more processors are configured to generate a UWB scrambled timestamp sequence (STS) packet such that the one or more zero-power symbols are included in: a physical layer header (PHR) of the data packet, a payload of the data packet, an STS portion of the data packet, or any combination thereof.

Clause 21. The UWB transmitter of any one of clauses 19-20 wherein the data packet comprises a narrow band (NB)-assisted UWB preamble.

Clause 22. The UWB transmitter of any one of clauses 19-21 wherein the one or more processors are further configured to determine a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 23. The UWB transmitter of clause 22 wherein the one or more processors are further configured to: determine a seed value for the predetermined algorithm; and send the seed value to the UWB receiver.

Clause 24. The UWB transmitter of any one of clauses 19-23 wherein the one or more processors are further configured to: subsequent to transmitting the data packet, receive a message from the UWB receiver indicating that RF interference has been detected; and responsive to receiving the message from the UWB receiver indicating that the RF interference has been detected: increase a number of STS symbols, provide assistance data to the UWB receiver regarding an a priori distance, provide an indication of the RF interference to an application layer, end the UWB ranging session, or any combination thereof.

Clause 25. A ultra-wideband (UWB) receiver for enabling secure UWB ranging, the UWB receiver comprising: a transceiver; a memory; and one or more processors communicatively coupled with the transceiver and the memory, wherein the one or more processors are configured to: receive a data packet with the transceiver via UWB radio frequency (RF) signals from a UWB transmitter, wherein: the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols; determine a level of RF interference based on one or more RF signal measurements performed at the UWB receiver during the one or more zero-power symbols; and provide an output indicative of the level of RF interference.

Clause 26. The UWB receiver of clause 25, wherein, to perform the one or more RF signal measurements, the one or more processors are configured to perform one or more measurements of RF signal power during the one or more zero-power symbols.

Clause 27. The UWB receiver of clause 26 wherein the one or more measurements of RF signal power comprise: a maximum power level, an average power level, a power spectral density (PSD), or any combination thereof.

Clause 28. The UWB receiver of any one of clauses 26-27 wherein the one or more processors are further configured to: perform one or more measurements of RF signal power during one or more non-zero-power symbols; and determine the level of RF interference by comparing RF signal power during the one or more zero-power symbols with RF signal power during one or more non-zero-power symbols.

Clause 29. The UWB receiver of any one of clauses 25-28 wherein, to provide the output, the one or more processors are configured to provide the output at a scrambled timestamp sequence (STS) post-processing unit of the UWB receiver.

Clause 30. The UWB receiver of any one of clauses 25-29 wherein the one or more processors are further configured to: determine that the level of RF interference exceeds a minimum threshold; and responsive to determining that the level of RF interference exceeds the minimum threshold, send a message to the UWB transmitter indicating that RF interference has been detected.

Clause 31. The UWB receiver of any one of clauses 25-30 wherein the one or more processors are further configured to: determine that the level of RF interference exceeds a minimum threshold; and responsive to determining the level of RF interference exceeds the minimum threshold, disregard demodulated data from the data packet.

Clause 32. The UWB receiver of any one of clauses 25-31 wherein the one or more processors are further configured to: determine the level of RF interference exceeds a minimum threshold; and responsive to determining that the level of RF interference exceeds the minimum threshold, implement interference mitigation for processing the data packet.

Clause 33. The UWB receiver of any one of clauses 25-32 wherein, to receive the data packet, the one or more processors are configured to receive a UWB STS packet wherein the one or more zero-power symbols are included in a physical layer header (PHR) of the data packet, a payload of the data packet, an STS portion of the data packet, or any combination thereof.

Clause 34. The UWB receiver of any one of clauses 25-33 wherein, to receive the data packet, the one or more processors are configured to receive a narrow band (NB)-assisted UWB preamble.

Clause 35. The UWB receiver of any one of clauses 25-34 wherein the one or more processors are further configured to determine a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 36. The UWB receiver of any one of clauses 25-35 wherein the one or more processors are further configured to receive, from the UWB transmitter, a seed value for the predetermined algorithm.

Clause 37. An apparatus for enabling secure ultra-wideband (UWB) ranging, the apparatus comprising: means for generating, at a UWB transmitter, a data packet for performing the UWB ranging, wherein: the data packet comprises a plurality of symbols, and the data packet further includes one or more zero-power symbols at one or more respective pseudo-random locations in the plurality of symbols; and means for transmitting the data packet via UWB radio frequency (RF) signals during a UWB ranging session between the UWB transmitter and a UWB receiver.

Clause 38. The apparatus of clause 37, further comprising means for determining a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 39. The apparatus of clause 38 further comprising means for determining a seed value for the predetermined algorithm; and means for sending the seed value to the UWB receiver.

Clause 40. An apparatus for enabling secure ultra-wideband (UWB) ranging, the apparatus comprising: means for receiving a data packet at a UWB receiver via UWB radio frequency (RF) signals from a UWB transmitter, wherein: the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols; means for determining a level of RF interference based on one or more RF signal measurements performed at the UWB receiver during the one or more zero-power symbols; and means for providing an output at the UWB receiver, the output indicative of the level of RF interference.

Clause 41. The apparatus of clause 40, further comprising means for performing the one or more RF signal measurements at least in part by performing one or more measurements of RF signal power during the one or more zero-power symbols.

Clause 42. The apparatus of any clause 41 further comprising means for performing one or more measurements of RF signal power during one or more non-zero-power symbols; and means for determining the level of RF interference by comparing RF signal power during the one or more zero-power symbols with RF signal power during one or more non-zero-power symbols.

Clause 43. The apparatus of any one of clauses 40-42 further comprising means for determining that the level of RF interference exceeds a minimum threshold; and means for, responsive to determining that the level of RF interference exceeds the minimum threshold: sending a message to the UWB transmitter indicating that RF interference has been detected, disregarding demodulated data from the data packet, implementing interference mitigation for processing the data packet, or any combination thereof.

Clause 44. The apparatus of any one of clauses 40-43 further comprising means for determining a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 45. A non-transitory computer-readable medium storing instructions for enabling secure ultra-wideband (UWB) ranging, the instructions comprising code for: generating, at a UWB transmitter, a data packet for performing the UWB ranging, wherein: the data packet comprises a plurality of symbols, and the data packet further includes one or more zero-power symbols at one or more respective pseudo-random locations in the plurality of symbols; and transmitting the data packet by the UWB transmitter via UWB radio frequency (RF) signals during a UWB ranging session between the UWB transmitter and a UWB receiver.

Clause 46. The computer-readable medium of clause 45, wherein the instructions further comprise code for determining a characteristic of the one or more zero-power symbols in accordance with a predetermined algorithm, wherein the characteristic comprises: a number of the one or more zero-power symbols, the respective one or more pseudo-random locations of the one or more zero-power symbols within the data packet, a respective length of each of the one or more zero-power symbols, or any combination thereof.

Clause 47. The computer-readable medium of any one of clauses 45-46 wherein the instructions further comprise code for: subsequent to transmitting the data packet, receiving a message from the UWB receiver indicating that RF interference has been detected; and responsive to receiving the message from the UWB receiver indicating that the RF interference has been detected: increasing a number of STS symbols, providing assistance data to the UWB receiver regarding an a priori distance, providing an indication of the RF interference to an application layer, ending the UWB ranging session, or any combination thereof.

Clause 48. A non-transitory computer-readable medium storing instructions for enabling secure ultra-wideband (UWB) ranging, the instructions comprising code for: receiving a data packet at a UWB receiver via UWB radio frequency (RF) signals from a UWB transmitter, wherein: the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols; determining a level of RF interference based on one or more RF signal measurements performed at the UWB receiver during the one or more zero-power symbols; and providing an output at the UWB receiver, the output indicative of the level of RF interference.

Clause 49. The computer-readable medium of clause 48, wherein the code for performing the one or more RF signal measurements comprises code for performing one or more measurements of RF signal power during the one or more zero-power symbols.

Clause 50. The computer-readable medium of any one of clauses 48-49 wherein the instructions further comprise code for: determining that the level of RF interference exceeds a minimum threshold; and responsive to determining that the level of RF interference exceeds the minimum threshold: sending a message to the UWB transmitter indicating that RF interference has been detected, disregarding demodulated data from the data packet, or implementing interference mitigation for processing the data packet, or any combination thereof.

What is claimed is:

1. A method of enabling secure ultra-wideband (UWB) ranging, the method comprising:
    generating, at a UWB transmitter, a data packet for performing the UWB ranging, wherein:
        the data packet comprises a plurality of symbols, and
        the data packet further includes one or more zero-power symbols at one or more respective pseudo-random locations in the plurality of symbols; and
    transmitting the data packet by the UWB transmitter via UWB radio frequency (RF) signals during a UWB ranging session between the UWB transmitter and a UWB receiver.

2. The method of claim 1, wherein the data packet comprises a UWB scrambled timestamp sequence (STS) packet, and wherein the one or more zero-power symbols are included in:
    a physical layer header (PHR) of the data packet,
    a payload of the data packet,
    an STS portion of the data packet, or
    any combination thereof.

3. The method of claim 1, wherein the data packet comprises a narrow band (NB)-assisted UWB preamble.

4. The method of claim 1, further comprising determining a characteristic of the one or more zero-power symbols in accordance with a predetermined algorithm, wherein the characteristic comprises:
    a number of the one or more zero-power symbols,
    the respective one or more pseudo-random locations of the one or more zero-power symbols within the data packet,
    a respective length of each of the one or more zero-power symbols, or
    any combination thereof.

5. The method of claim 4, further comprising:
    determining a seed value for the predetermined algorithm; and
    sending the seed value to the UWB receiver.

6. The method of claim 1, further comprising:
    subsequent to transmitting the data packet, receiving a message from the UWB receiver indicating that RF interference has been detected; and
    responsive to receiving the message from the UWB receiver indicating that the RF interference has been detected:
        increasing a number of STS symbols,
        providing assistance data to the UWB receiver regarding an a priori distance,
        providing an indication of the RF interference to an application layer,
        ending the UWB ranging session, or
        any combination thereof.

7. A method of enabling secure ultra-wideband (UWB) ranging, the method comprising:
    receiving a data packet at a UWB receiver via UWB radio frequency (RF) signals from a UWB transmitter, wherein:
        the data packet is received during a UWB ranging session between the UWB receiver and the UWB transmitter,
        the data packet comprises a plurality of symbols, and
        the data packet further includes one or more zero-power symbols at one or more respective pseudo-random locations in the plurality of symbols;
    determining a level of RF interference based on one or more RF signal measurements performed at the UWB receiver during the one or more zero-power symbols; and
    providing an output at the UWB receiver, the output indicative of the level of RF interference.

8. The method of claim 7, wherein performing the one or more RF signal measurements comprises performing one or more measurements of RF signal power during the one or more zero-power symbols.

9. The method of claim 8, wherein the one or more measurements of RF signal power comprise:
    a maximum power level,
    an average power level,
    a power spectral density (PSD), or
    any combination thereof.

10. The method of claim 8, further comprising:
    performing one or more measurements of RF signal power during one or more non-zero-power symbols; and
    determining the level of RF interference by comparing RF signal power during the one or more zero-power symbols with RF signal power during one or more non-zero-power symbols.

11. The method of claim 7, wherein providing the output comprises providing the output at a scrambled timestamp sequence (STS) post-processing unit of the UWB receiver.

12. The method of claim 7, further comprising:
    determining that the level of RF interference exceeds a minimum threshold; and
    responsive to determining that the level of RF interference exceeds the minimum threshold, sending a message to the UWB transmitter indicating that RF interference has been detected.

13. The method of claim 7, further comprising:
determining that the level of RF interference exceeds a minimum threshold; and
responsive to determining the level of RF interference exceeds the minimum threshold, disregarding demodulated data from the data packet.

14. The method of claim 7, further comprising:
determining the level of RF interference exceeds a minimum threshold; and
responsive to determining that the level of RF interference exceeds the minimum threshold, implementing interference mitigation for processing the data packet.

15. The method of claim 7, wherein the data packet comprises a UWB STS packet, and wherein the one or more zero-power symbols are included in:
a physical layer header (PHR) of the data packet,
a payload of the data packet,
an STS portion of the data packet, or
any combination thereof.

16. The method of claim 7, wherein the data packet comprises a narrow band (NB)-assisted UWB preamble.

17. The method of claim 7, further comprising determining a characteristic of the one or more zero-power symbols in accordance with a predetermined algorithm, wherein the characteristic comprises:
a number of the one or more zero-power symbols,
the respective one or more pseudo-random locations of the one or more zero-power symbols within the data packet,
a respective length of each of the one or more zero-power symbols, or
any combination thereof.

18. The method of claim 17, further comprising receiving, from the UWB transmitter, a seed value for the predetermined algorithm.

19. A ultra-wideband (UWB) transmitter for enabling secure UWB ranging, the UWB transmitter comprising:
a transceiver;
a memory; and
one or more processors communicatively coupled with the transceiver and the memory, wherein the one or more processors are configured to:
generate a data packet for performing the UWB ranging, wherein:
the data packet comprises a plurality of symbols, and
the data packet further includes one or more zero-power symbols at one or more respective pseudo-random locations in the plurality of symbols; and
transmit the data packet with the transceiver via UWB radio frequency (RF) signals during a UWB ranging session between the UWB transmitter and a UWB receiver.

20. The UWB transmitter of claim 19, wherein, to generate the data packet, the one or more processors are configured to generate a UWB scrambled timestamp sequence (STS) packet such that the one or more zero-power symbols are included in:
a physical layer header (PHR) of the data packet,
a payload of the data packet,
an STS portion of the data packet, or
any combination thereof.

21. The UWB transmitter of claim 19, wherein the data packet comprises a narrow band (NB)-assisted UWB preamble.

22. The UWB transmitter of claim 19, wherein the one or more processors are further configured to determine a characteristic of the one or more zero-power symbols in accordance with a predetermined algorithm, wherein the characteristic comprises:
a number of the one or more zero-power symbols,
the respective one or more pseudo-random locations of the one or more zero-power symbols within the data packet,
a respective length of each of the one or more zero-power symbols, or
any combination thereof.

23. The UWB transmitter of claim 22, wherein the one or more processors are further configured to:
determine a seed value for the predetermined algorithm; and
send the seed value to the UWB receiver.

24. The UWB transmitter of claim 19, wherein the one or more processors are further configured to:
subsequent to transmitting the data packet, receive a message from the UWB receiver indicating that RF interference has been detected; and
responsive to receiving the message from the UWB receiver indicating that the RF interference has been detected:
increase a number of STS symbols,
provide assistance data to the UWB receiver regarding an a priori distance,
provide an indication of the RF interference to an application layer,
end the UWB ranging session, or
any combination thereof.

25. A ultra-wideband (UWB) receiver for enabling secure UWB ranging, the UWB receiver comprising:
a transceiver;
a memory; and
one or more processors communicatively coupled with the transceiver and the memory, wherein the one or more processors are configured to:
receive a data packet with the transceiver via UWB radio frequency (RF) signals from a UWB transmitter, wherein:
the data packet is received during a UWB ranging session between the UWB receiver and the UWB transmitter,
the data packet comprises a plurality of symbols, and
the data packet further includes one or more zero-power symbols at one or more respective pseudo-random locations in the plurality of symbols;
determine a level of RF interference based on one or more RF signal measurements performed at the UWB receiver during the one or more zero-power symbols; and
provide an output indicative of the level of RF interference.

26. The UWB receiver of claim 25, wherein, to perform the one or more RF signal measurements, the one or more processors are configured to perform one or more measurements of RF signal power during the one or more zero-power symbols.

27. The UWB receiver of claim 26, wherein the one or more measurements of RF signal power comprise:
a maximum power level,
an average power level,
a power spectral density (PSD), or
any combination thereof.

28. The UWB receiver of claim 26, wherein the one or more processors are further configured to:
  perform one or more measurements of RF signal power during one or more non-zero-power symbols; and
  determine the level of RF interference by comparing RF signal power during the one or more zero-power symbols with RF signal power during one or more non-zero-power symbols.

29. The UWB receiver of claim 25, wherein, to provide the output, the one or more processors are configured to provide the output at a scrambled timestamp sequence (STS) post-processing unit of the UWB receiver.

30. The UWB receiver of claim 25, wherein the one or more processors are further configured to:
  determine that the level of RF interference exceeds a minimum threshold; and
  responsive to determining that the level of RF interference exceeds the minimum threshold, send a message to the UWB transmitter indicating that RF interference has been detected.

31. The UWB receiver of claim 25, wherein the one or more processors are further configured to:
  determine that the level of RF interference exceeds a minimum threshold; and
  responsive to determining the level of RF interference exceeds the minimum threshold, disregard demodulated data from the data packet.

32. The UWB receiver of claim 25, wherein the one or more processors are further configured to:
  determine the level of RF interference exceeds a minimum threshold; and
  responsive to determining that the level of RF interference exceeds the minimum threshold, implement interference mitigation for processing the data packet.

33. The UWB receiver of claim 25, wherein, to receive the data packet, the one or more processors are configured to receive a UWB STS packet wherein the one or more zero-power symbols are included in:
  a physical layer header (PHR) of the data packet,
  a payload of the data packet,
  an STS portion of the data packet, or
  any combination thereof.

34. The UWB receiver of claim 25, wherein, to receive the data packet, the one or more processors are configured to receive a narrow band (NB)-assisted UWB preamble.

35. The UWB receiver of claim 25, wherein the one or more processors are further configured to determine a characteristic of the one or more zero-power symbols in accordance with a predetermined algorithm, wherein the characteristic comprises:
  a number of the one or more zero-power symbols,
  the respective one or more pseudo-random locations of the one or more zero-power symbols within the data packet,
  a respective length of each of the one or more zero-power symbols, or
  any combination thereof.

36. The UWB receiver of claim 35, wherein the one or more processors are further configured to receive, from the UWB transmitter, a seed value for the predetermined algorithm.

37. An apparatus for enabling secure ultra-wideband (UWB) ranging, the apparatus comprising:
  means for generating, at a UWB transmitter, a data packet for performing the UWB ranging, wherein:
    the data packet comprises a plurality of symbols, and
    the data packet further includes one or more zero-power symbols at one or more respective pseudo-random locations in the plurality of symbols; and
  means for transmitting the data packet via UWB radio frequency (RF) signals during a UWB ranging session between the UWB transmitter and a UWB receiver.

38. The apparatus of claim 37, further comprising means for determining a characteristic of the one or more zero-power symbols in accordance with a predetermined algorithm, wherein the characteristic comprises:
  a number of the one or more zero-power symbols,
  the respective one or more pseudo-random locations of the one or more zero-power symbols within the data packet,
  a respective length of each of the one or more zero-power symbols, or
  any combination thereof.

39. The apparatus of claim 38, further comprising:
  means for determining a seed value for the predetermined algorithm; and
  means for sending the seed value to the UWB receiver.

40. An apparatus for enabling secure ultra-wideband (UWB) ranging, the apparatus comprising:
  means for receiving a data packet at a UWB receiver via UWB radio frequency (RF) signals from a UWB transmitter, wherein:
    the data packet is received during a UWB ranging session between the UWB receiver and the UWB transmitter,
    the data packet comprises a plurality of symbols, and
    the data packet further includes one or more zero-power symbols at one or more respective pseudo-random locations in the plurality of symbols;
  means for determining a level of RF interference based on one or more RF signal measurements performed at the UWB receiver during the one or more zero-power symbols; and
  means for providing an output at the UWB receiver, the output indicative of the level of RF interference.

41. The apparatus of claim 40, further comprising means for performing the one or more RF signal measurements at least in part by performing one or more measurements of RF signal power during the one or more zero-power symbols.

42. The apparatus of claim 41, further comprising:
  means for performing one or more measurements of RF signal power during one or more non-zero-power symbols; and
  means for determining the level of RF interference by comparing RF signal power during the one or more zero-power symbols with RF signal power during one or more non-zero-power symbols.

43. The apparatus of claim 40, further comprising:
  means for determining that the level of RF interference exceeds a minimum threshold; and
  means for, responsive to determining that the level of RF interference exceeds the minimum threshold:
    sending a message to the UWB transmitter indicating that RF interference has been detected,
    disregarding demodulated data from the data packet,
    implementing interference mitigation for processing the data packet, or
    any combination thereof.

44. The apparatus of claim 40, further comprising means for determining a characteristic of the one or more zero-power symbols in accordance with a predetermined algorithm, wherein the characteristic comprises:

a number of the one or more zero-power symbols, the respective one or more pseudo-random locations of the one or more zero-power symbols within the data packet, a respective length of each of the one or more zero-power symbols, or any combination thereof.

45. A non-transitory computer-readable medium storing instructions for enabling secure ultra-wideband (UWB) ranging, the instructions comprising code for:

generating, at a UWB transmitter, a data packet for performing the UWB ranging, wherein:

the data packet comprises a plurality of symbols, and the data packet further includes one or more zero-power symbols at one or more respective pseudo-random locations in the plurality of symbols; and transmitting the data packet by the UWB transmitter via UWB radio frequency (RF) signals during a UWB ranging session between the UWB transmitter and a UWB receiver.

46. The computer-readable medium of claim 45, wherein the instructions further comprise code for determining a characteristic of the one or more zero-power symbols in accordance with a predetermined algorithm, wherein the characteristic comprises:

a number of the one or more zero-power symbols, the respective one or more pseudo-random locations of the one or more zero-power symbols within the data packet, a respective length of each of the one or more zero-power symbols, or any combination thereof.

47. The computer-readable medium of claim 45, wherein the instructions further comprise code for:

subsequent to transmitting the data packet, receiving a message from the UWB receiver indicating that RF interference has been detected; and responsive to receiving the message from the UWB receiver indicating that the RF interference has been detected:

increasing a number of STS symbols, providing assistance data to the UWB receiver regarding an a priori distance, providing an indication of the RF interference to an application layer, ending the UWB ranging session, or any combination thereof.

48. A non-transitory computer-readable medium storing instructions for enabling secure ultra-wideband (UWB) ranging, the instructions comprising code for:

receiving a data packet at a UWB receiver via UWB radio frequency (RF) signals from a UWB transmitter, wherein:

the data packet is received during a UWB ranging session between the UWB receiver and the UWB transmitter, the data packet comprises a plurality of symbols, and the data packet further includes one or more zero-power symbols at one or more respective pseudo-random locations in the plurality of symbols;

determining a level of RF interference based on one or more RF signal measurements performed at the UWB receiver during the one or more zero-power symbols; and providing an output at the UWB receiver, the output indicative of the level of RF interference.

49. The computer-readable medium of claim 48, wherein the code for performing the one or more RF signal measurements comprises code for performing one or more measurements of RF signal power during the one or more zero-power symbols.

50. The computer-readable medium of claim 48, wherein the instructions further comprise code for:

determining that the level of RF interference exceeds a minimum threshold; and responsive to determining that the level of RF interference exceeds the minimum threshold:

sending a message to the UWB transmitter indicating that RF interference has been detected, disregarding demodulated data from the data packet, or implementing interference mitigation for processing the data packet, or any combination thereof.

\* \* \* \* \*